(12) United States Patent
Bleda et al.

(10) Patent No.: US 11,782,993 B2
(45) Date of Patent: Oct. 10, 2023

(54) METHODS AND SYSTEMS FOR INTERACTIVE DATA MANAGEMENT

(71) Applicant: MARKETSPRINGPAD IP USA LLC., Laredo, TX (US)

(72) Inventors: Erdi Ata Bleda, Istanbul (TR); Halil Dogan Bolak, Istanbul (TR); Kerim Richard Derhalli, London (GB)

(73) Assignee: MARKETSPRINGPAD IP USA LLC., Laredo, TX (US)

( * ) Notice: Subject to any disclaimer, the term of this patent is extended or adjusted under 35 U.S.C. 154(b) by 635 days.

(21) Appl. No.: 16/662,711

(22) Filed: Oct. 24, 2019

(65) Prior Publication Data
US 2020/0133983 A1 Apr. 30, 2020

Related U.S. Application Data

(60) Provisional application No. 62/749,967, filed on Oct. 24, 2018.

(51) Int. Cl.
*G06N 10/00* (2022.01)
*G06F 16/9535* (2019.01)
(Continued)

(52) U.S. Cl.
CPC .......... *G06F 16/9535* (2019.01); *G06N 5/04* (2013.01); *G06N 10/00* (2019.01); *G06N 20/00* (2019.01); *G09B 19/18* (2013.01)

(58) Field of Classification Search
CPC ...... G06F 16/9535; G06F 17/16; G06F 21/45; G06N 3/0454; G06N 3/084; G06N 5/022;
(Continued)

(56) References Cited

U.S. PATENT DOCUMENTS 11,308,503 B2 * 4/2022 Hutchings .......... G06Q 30/0201
2006/0212444 A1 9/2006 Handman et al.
(Continued)

FOREIGN PATENT DOCUMENTS

CN 107292528 A 10/2017

OTHER PUBLICATIONS

Jan. 21, 2020—(PCT) International Search Report and Written Opinion—App No. PCT/US2019/57892.
(Continued)

*Primary Examiner* — Le H Luu
(74) *Attorney, Agent, or Firm* — Darrell G. Mottley

(57) ABSTRACT

The processor(s) may be configured to electronically process a computer readable set of user data records to generate media consumption data. The processor(s) may be configured to electronically process the computer readable set of user data records to generate social media interaction data. In some implementations, the processor(s) may be configured to electronically process the computer readable set of user data records to generate gaming interaction data. In yet some implementations, the processor(s) may be configured to electronically process the media consumption data, the social media interaction data and the gaming interaction data with a quantum recommendation engine/module. In some implementations, the processor(s) may be configured to generating a computer readable user profile vector associated with at least one of the user data records.

20 Claims, 20 Drawing Sheets

(51) Int. Cl.
*G09B 19/18* (2006.01)
*G06N 20/00* (2019.01)
*G06N 5/04* (2023.01)

(58) Field of Classification Search
CPC .......... G06N 5/04; G06N 10/00; G06N 20/00; G09B 19/18; A61B 5/6898; G06Q 30/0201; G06Q 30/0251; G06Q 30/0282; G06Q 50/01; H04L 67/535; H04N 21/252; H04N 21/44204
See application file for complete search history.

(56) References Cited

U.S. PATENT DOCUMENTS

| | | |
|---|---|---|
| 2010/0100416 A1 | 4/2010 | Herbrich et al. |
| 2013/0204825 A1 | 8/2013 | Su |
| 2013/0226839 A1 | 8/2013 | Archambeau et al. |
| 2013/0332388 A1 | 12/2013 | Martell et al. |
| 2014/0365398 A1* | 12/2014 | Dalton ............... G06Q 30/0282 705/347 |
| 2015/0220525 A1 | 8/2015 | Ross et al. |
| 2015/0279174 A1 | 10/2015 | Hyde et al. |
| 2016/0117722 A1* | 4/2016 | Garcia ............... G06Q 30/0251 705/14.49 |
| 2016/0180362 A1* | 6/2016 | Brown ............. H04N 21/44204 705/7.29 |
| 2016/0202857 A1* | 7/2016 | Rivera ................... G06Q 50/01 715/716 |
| 2017/0208370 A1* | 7/2017 | Ray ....................... H04N 21/252 |
| 2017/0293873 A1 | 10/2017 | Chrapko |
| 2018/0075137 A1* | 3/2018 | Lifar ....................... G06F 17/16 |
| 2018/0144256 A1* | 5/2018 | Saxena ................... G06N 20/00 |
| 2018/0213058 A1* | 7/2018 | Loeb ..................... H04L 67/535 |
| 2018/0219917 A1* | 8/2018 | Chiang ................... G06F 21/45 |
| 2019/0005586 A1 | 1/2019 | Lei et al. |
| 2019/0282155 A1* | 9/2019 | St Amant ............. A61B 5/6898 |
| 2020/0005196 A1* | 1/2020 | Cai ..................... G06F 16/9535 |

OTHER PUBLICATIONS

Feb. 14, 2023—(EP) Search Report—U.S. Appl. No. 19/875,586.
Mar. 3, 2023—(SG) Search Report—App 11202104254U.

* cited by examiner

```
for each user USER on the recommendation list do
    if USER_QPROFILE exists then
        load existing USER_QPROFILE of USER
    else
        USER_QPROFILE ← initial quantum data based on USER's preferences
        in the app
    end if
    for each time step t_i since the last profiling session to
    this session do
        USER_ACTIVITIES[USER] ← collect user activities of USER
        within t_i and t_i + δt
        for each instrument INST do
            if any USER_ACTIVITIES[USER] of INST exists then
                if the center of the trapping potential q_c of INST of USER > 10%
                of L then
                    USER_QPROFILE.q_c[INST] ← USER_QPROFILE.q_c[INST] − δq
                end if
            else
                if the center of the trapping potential q_c < 90% of L then
                    USER_QPROFILE.q_c[INST] ← USER_QPROFILE.q_c[INST] + δλ
                end if
            end if
            USER_QPROFILE.ψ[INST] ← Propagated wave function of INST
            of USER for a duration of δt
        end for
    end for
    save updated USER_QPROFILE
end for Constants:
    − a_0: Bohr radius
    − ℏ: Reduced Planck constant
    − L: Length of the simulation box (interest space)
    − m: Mass of the user's interest
    − δω: Depth of the drifting potential
    − δq: A shift in the (+) interest direction (a bonus)
    − δλ: A shift in the (−) interest direction (a decay in interest)
    − δt: Time interval
```

```
profile all users up to the time of recommendation and update USER_QPROFILEs
for each user USER do
   if USER has existing USER_QPROFILE then
      load USER_QPROFILE of USER
   else
      skip USER
   end if
   PROFILE_VECT ← init zero vector in instrument space
   for each instrument INST do
      COMPONENT_VECTOR ← generate probability for INST of USER
         from USER_QPROFILE.ψ[INST]
      PROFILE_VECTOR ← add COMPONENT_VECTOR to PROFILE_VECTOR
   end for
   NORMALIZED_PROFILE_VECTOR ← normalize PROFILE_VECTOR
   SIMILARITY_SCORES ← {}
   for each content vector CONTENT_VECTOR in
      CONTENT_CONTAINER do
         append similarity score between NORMALIZED_PROFILE_VECTOR
            and CONTENT_VECTOR to SIMILARITY_SCORES with its content
            id CONTENT_ID
   end for
   SORTED_SIMILARITY_SCORES ← sort SIMILARITY_SCORES
      in descending order
   save the first N CONTENT_IDs from SORTED_SIMILARITY_SCORES
      for USER
end for
```

Constants:
- $a_0$: Bohr radius
- $\hbar$: Reduced Planck constant
- $L$: Length of the simulation box (interest space)
- $m$: Mass of the user's interest
- $\delta_0$: Depth of the drifting potential
- $\delta q$: A shift in the (+) interest direction (a focus)
- $\delta \lambda$: A shift in the (−) interest direction (a decay in interest)
- $\delta t$: Time interval

FIG. 13

METHODS AND SYSTEMS FOR INTERACTIVE DATA MANAGEMENT

CROSS-REFERENCE TO RELATED APPLICATIONS

The present application claims priority to U.S. Application No. 62/749,967, filed Oct. 24, 2018, the contents of which are incorporated herein by reference in their entirety.

FIELD OF THE DISCLOSURE

The present disclosure relates to methods, systems, and computing platforms for data interactive management with a quantum mechanical approach.

BACKGROUND

The age of Big Data is upon us. In the internet-of-things era, many digital products can be connected to the internet. Online gaming can be provided over computer networks. The world contains a vast amount of digital information which is getting ever vaster more rapidly. The effect is being felt everywhere, from business to science, from governments to the arts. Alan Greenspan remarked that: "The number one problem in today's generation and economy is the lack of financial literacy". In this environment, hundreds of millions of people globally are discouraged from learning to invest. Investing is the process of deploying savings in such a way that they can generate more consumption power in real terms in the future than could have enjoyed by spending those savings today. This relatively low lack of participation by the public has been recognized as an issue. Unfortunately, we have neglected our saving and investment. Three things prevent Individuals from investing lack of confidence, lack of knowledge and perceived lack of funds. There is a need to improve the technological processing in the new computing era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure relate to a system and method configured for data processing that aggregates one or more of gamification functionality, social functionality, content management functionality and asset order execution functionality. The system and method is supported by multiple components, such as engines or modules.

Aspects of the present disclosure relate to a system and method that provides a rich big data user experience on a technology platform environment. Aspects of the present disclosure relate to a system and method that provides rich big data sets derived from the user experience, and utilizes the outputs from a profiling process to provide rich content.

The system may include one or more hardware processors configured by machine-readable instructions. The processor(s) may be configured to electronically process a computer readable set of user data records to generate media consumption data. The processor(s) may be configured to electronically process the computer readable set of user data records to generate social interaction data. In some implementations, the processor(s) may be configured to electronically process the computer readable set of user data records to generate gaming interaction data. In yet some implementations, the processor(s) may be configured to electronically process the media consumption data, the media interaction data and the gaming interaction data with a quantum recommendation engine/module. In some implementations, the processor(s) may be configured to generating a computer readable user profile vector associated with at least one of the user data records.

In some implementations of the system and method, a gamification engine provides simulated trading activity within a portfolio management game. The gamification engine may provide real time mark to market of user account simulated trades and portfolios across global instruments and all major asset classes. In some implementations of the gamification engine, a live real-time fantasy league game play leaderboard is provided. In some implementations of the gamification engine, there is provided the ability to follow other user simulated trades, view their simulated portfolios and deep analysis into their holdings. In some implementations of the gamification engine, there is provided the ability for user member to create and manage their own private leagues and invite friends both from within the user community.

In some implementations of the system and method, there is provided interests profile creation and periodic update person vector via processing of the user "in-app" actions and behavior in near real-time via a quantum recommendation engine/module that creates and maintains this dynamic profile via multiple profiling algorithms.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 12 is an example process flow of data processing of an illustrative operation in accordance with one or more implementations.

FIG. 13 is an example process flow of data processing of an illustrative operation in accordance with one or more implementations.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
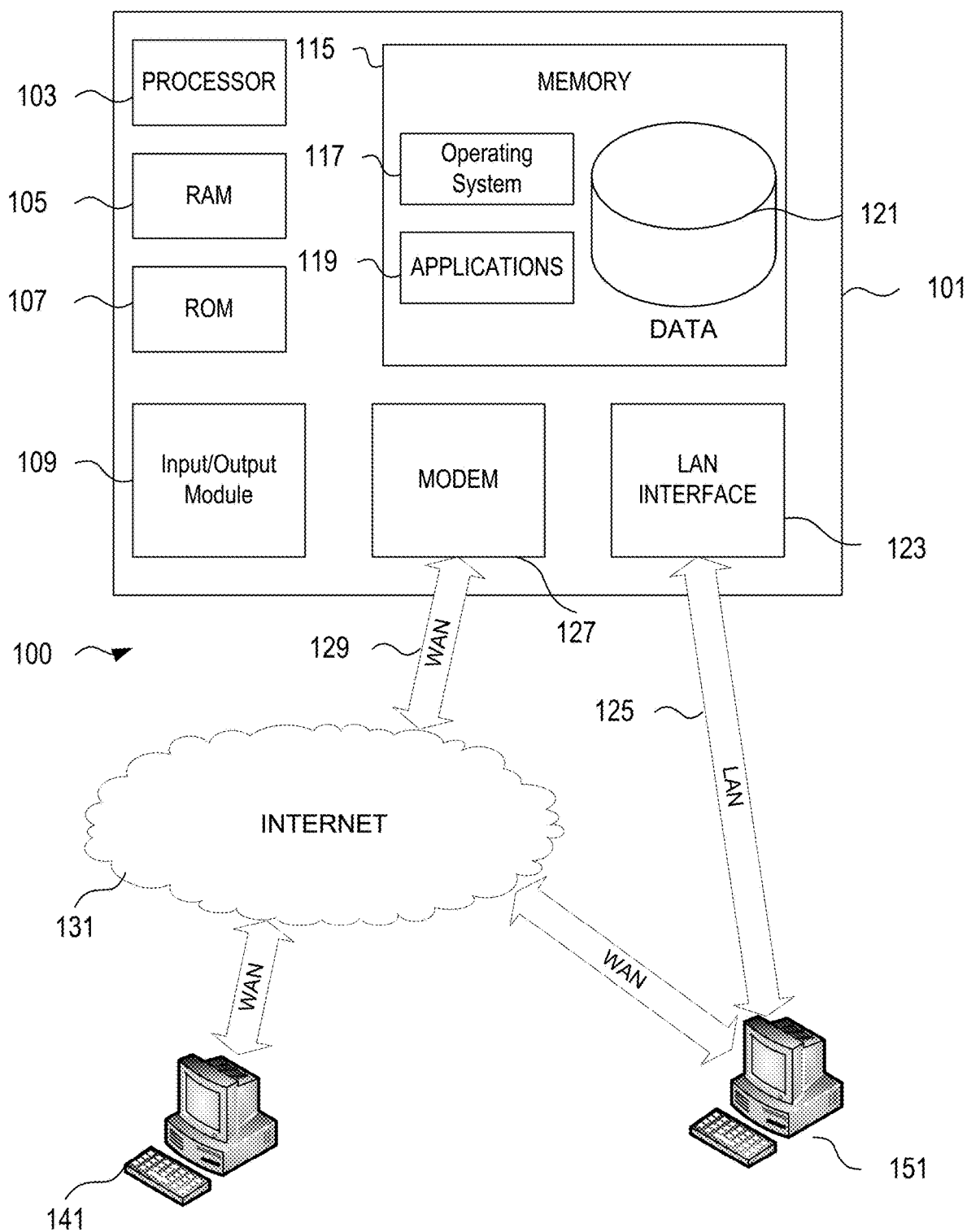
FIG. 1 illustrates a schematic diagram of a digital computing environment in which certain aspects of the present disclosure may be implemented.

FIG. 1 illustrates a block diagram of a specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, handheld or laptop devices, multiprocessor systems, microprocessor-based systems, cloud-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
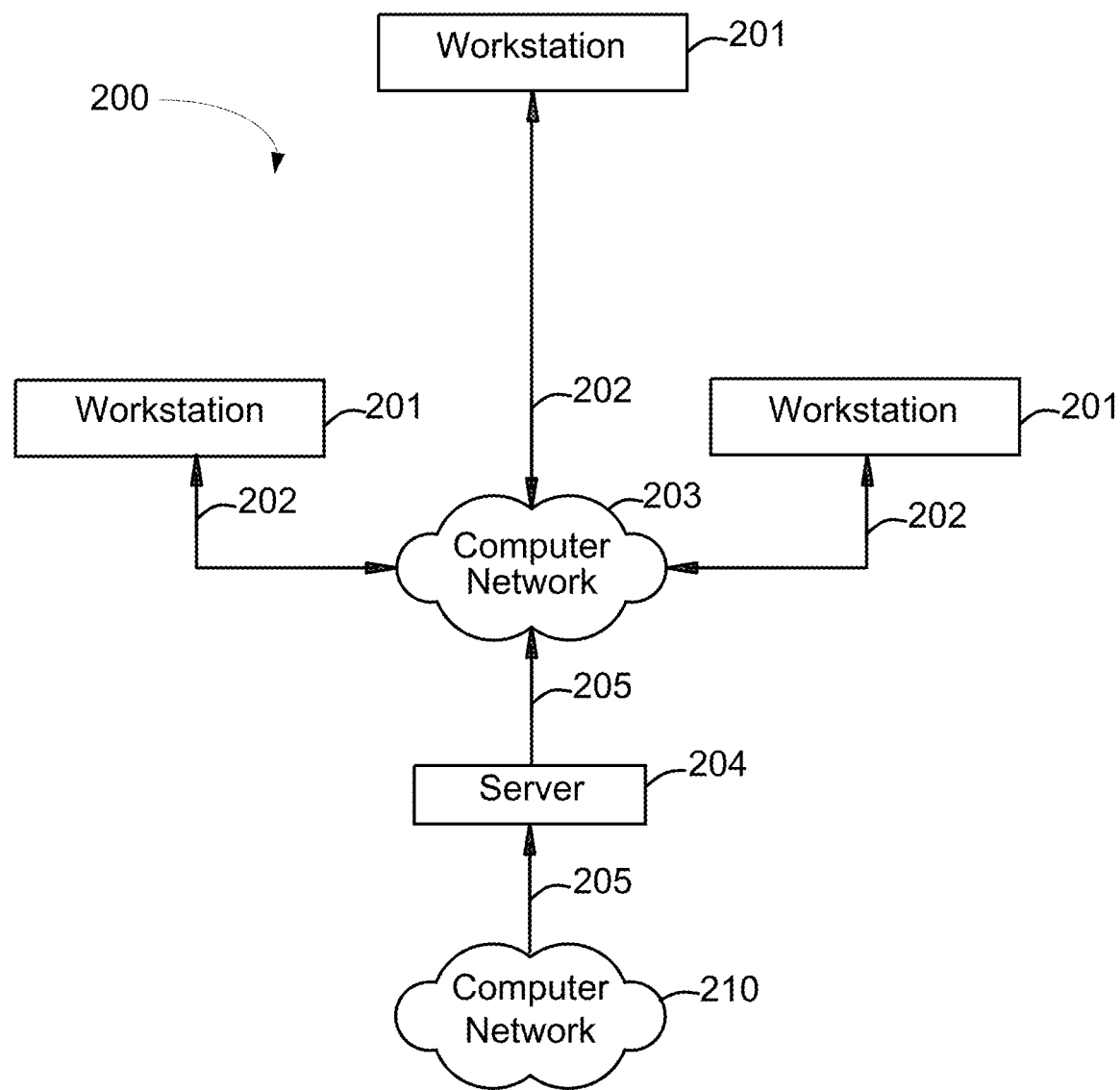
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3:
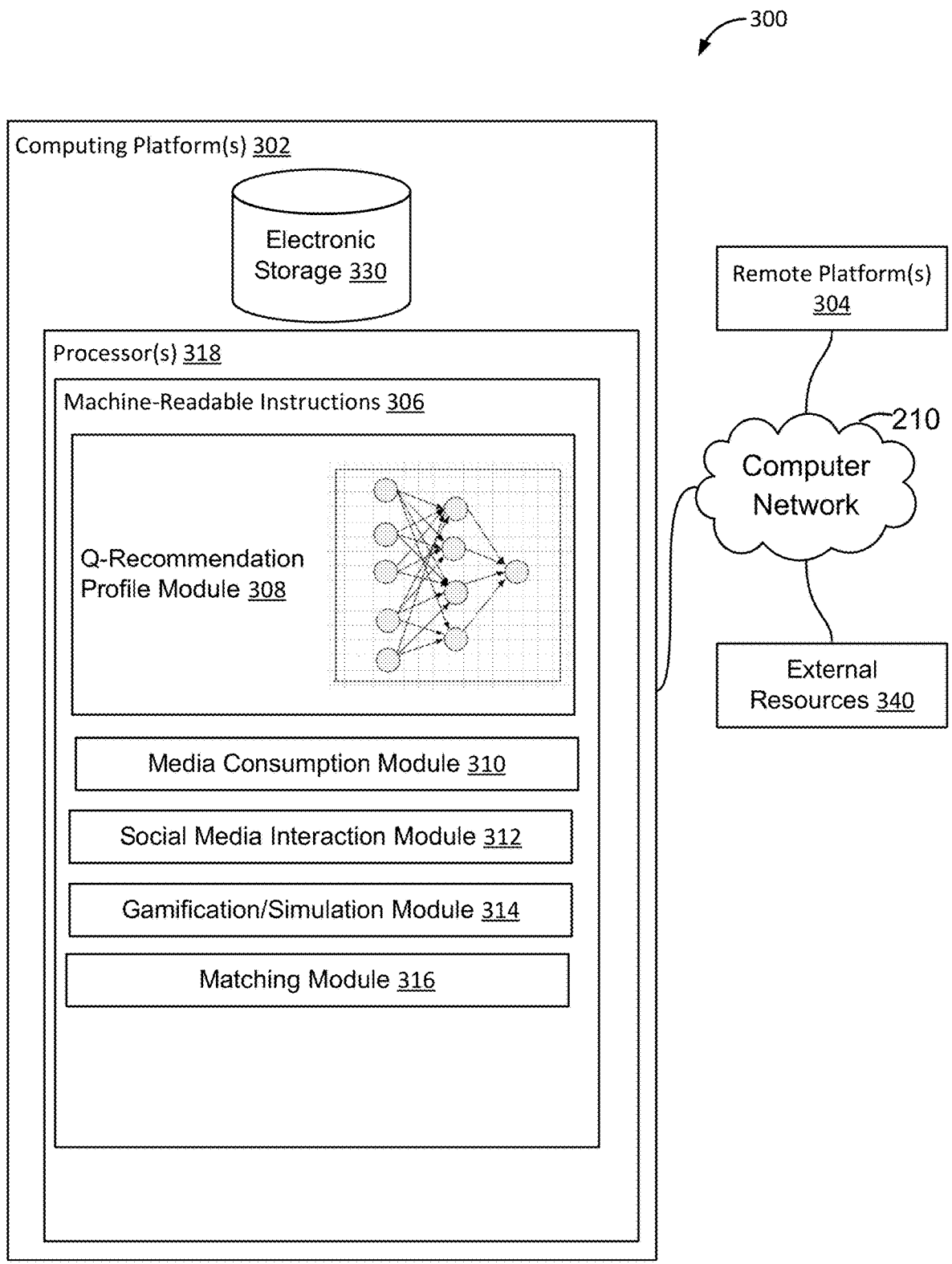
FIG. 3 illustrates a system configured for data processing, in accordance with one or more implementations.

FIG. 3 illustrates a system 300 configured for data processing, in accordance with one or more implementations. The disclosure may be described in the context of cloud-based computing architecture employing Amazon Web Service (AWS). Nevertheless, other commercially available cloud-based services may be used, such as Microsoft Azure, and Google Cloud. The system 300 API components may be provided in the AWS cloud and have been architected to scale in a resilient manner through the use of technologies chosen without any legacy dependencies. In some implementations of the system 300 and method, main persistent data storage pertains to Amazon DynamoDB—a fully managed proprietary NoSQL database service that supports key-value and document data structures—where content, interaction, profile and other non-financial information is stored. In some implementations of the system 300 and method, social graph data (i.e. relationships between users) is stored on Amazon Neptune—a fully managed graph database. In some implementations of the system 300 and method, scalability is supported by multiple Redis (Remote Dictionary Server by Redis Labs) clusters acting as read only in-memory databases. In some implementations of the system 300 and method, data is warehoused on Amazon Redshift—a cloud data warehouse—and reporting capability is built with Tableau BI toolset. In some implementations of the system 300 and method, API components (including daemons and engines) are coded in node.js with the exception of AI daemons that are coded with Python (with Google TensorFlow for clustering). In some implementations, clustering algorithms (almost any clustering algorithm can be applied once the profile vector is obtained) and machine learning may be implemented. In some implementations of the system 300 and method, some API components are executed on AWS Lambda (serverless computing) allowing highly scalable capacity to respond to user database interactions and system failure/warnings.

In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

In some implementations of the system 300 and method, user registration, profile creation and maintenance is provided. In some implementations of the system 300 and method, a security database, discovery mechanisms and instrument watchlist maintenance are provided to the user. In some implementations of the system 300 and method, the technology enables synchronization of the instrument database with multiple brokerage/custody systems. In some implementations of the system 300 and method, the technology enable social graph functionality by allowing discovery and following of other users in the system. In some implementations of the system 300 and method, social functionality enables posting on a media feed 700, the indications of liking, commenting and sharing posts—via a social graph database that allows for relationship maintenance. In some implementations of the system 300 and method, delivery of event notices to client devices is enabled via a mobile event management component with "Over-The Air' infrastructure technology. In some implementations of the system 300 and method, a two-way external social network interaction can be used to share from the media feed 700 onto other social networks and sharing of external content onto the media feed 700.

Figure 20:
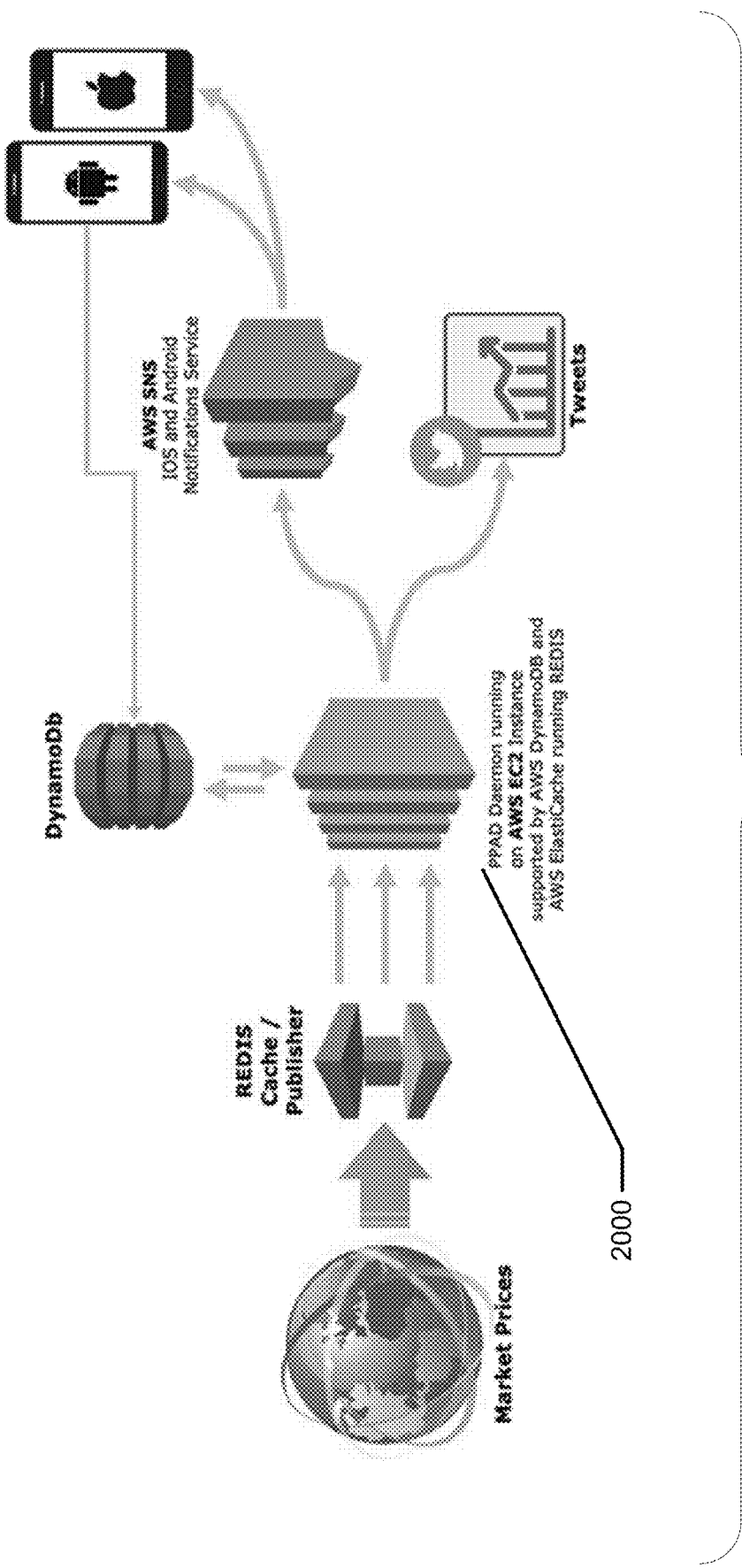
FIG. 20 is an example block diagram of an illustrative PPAD engine in accordance with one or more implementations.

Some implementations of the system 300 and method enable market data delivery of real time price data to users and delivery of price and game position profit/loss alerts to clients as notifications using PPAD engine 2000 (see FIG. 20). In some implementations, delivery of historical market data for charts and technical analysis can be provided to the mobile client (e.g., smart phones, wearable computing devices, tablets).

In some implementations of the system 300 and method, media content such as news, commentaries, calendars, fundamental data, research and community sentiment are delivered individually and tailored news, commentaries and research content to each user's feed 700 using the Profile and Recommendation Engines (Module 308). Users also have the ability to search through all historic news articles and community posts. Some implementations provide an "at-a-glance" Instrument Scores calculated from fundamental instrument data through the system 300. Additionally, real-time user community sentiment and trading accuracy can be provided to the user on a per instrument basis.

Computing platform(s) 302 may be configured by machine-readable instructions 306. Machine-readable instructions 306 may include one or more instruction modules or engines. The instruction modules may include computer program modules. The instruction modules may include one or more of quantum recommendation engine/module 308, media consumption module 310, social media interactions module 312 and a gamification module 314, a matching module 316 and/or other instruction modules.

The modules 308, 310, 312, 314, 316, and other modules implement APIs containing functions/sub-routines which can be executed by another software system, such as email and internet access controls. API denotes an Application Programming Interface. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art.

With reference to FIG. 3, quantum recommendation engine/module 308 receives the media consumption attribute data from media consumption module 312, the media interaction attribute data from the social media interactions module 314 and the gaming interaction attribute data from the gamification module 314 to generate at least one user profile vector or user profile vectors for each user of the system 300. The "attribute data" including ASCII characters in computer readable form or binary complied data, such as biometric data. The ASCII characters or binary data can be manipulated in the software of system 300.

Figure 6:
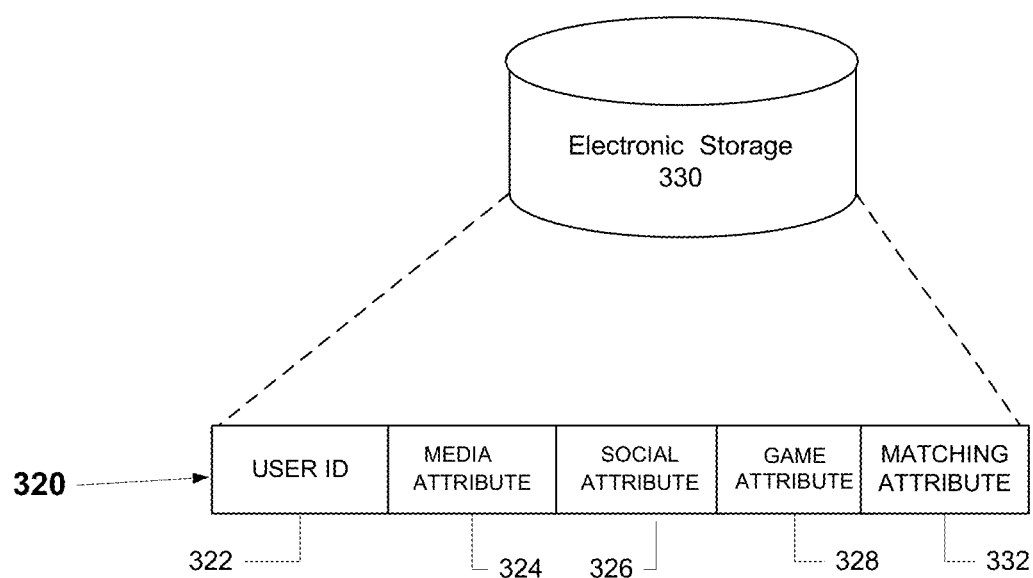
FIG. 6 is an example block diagram of an illustrative user data storage data in accordance with one or more implementations.
Figure 7:
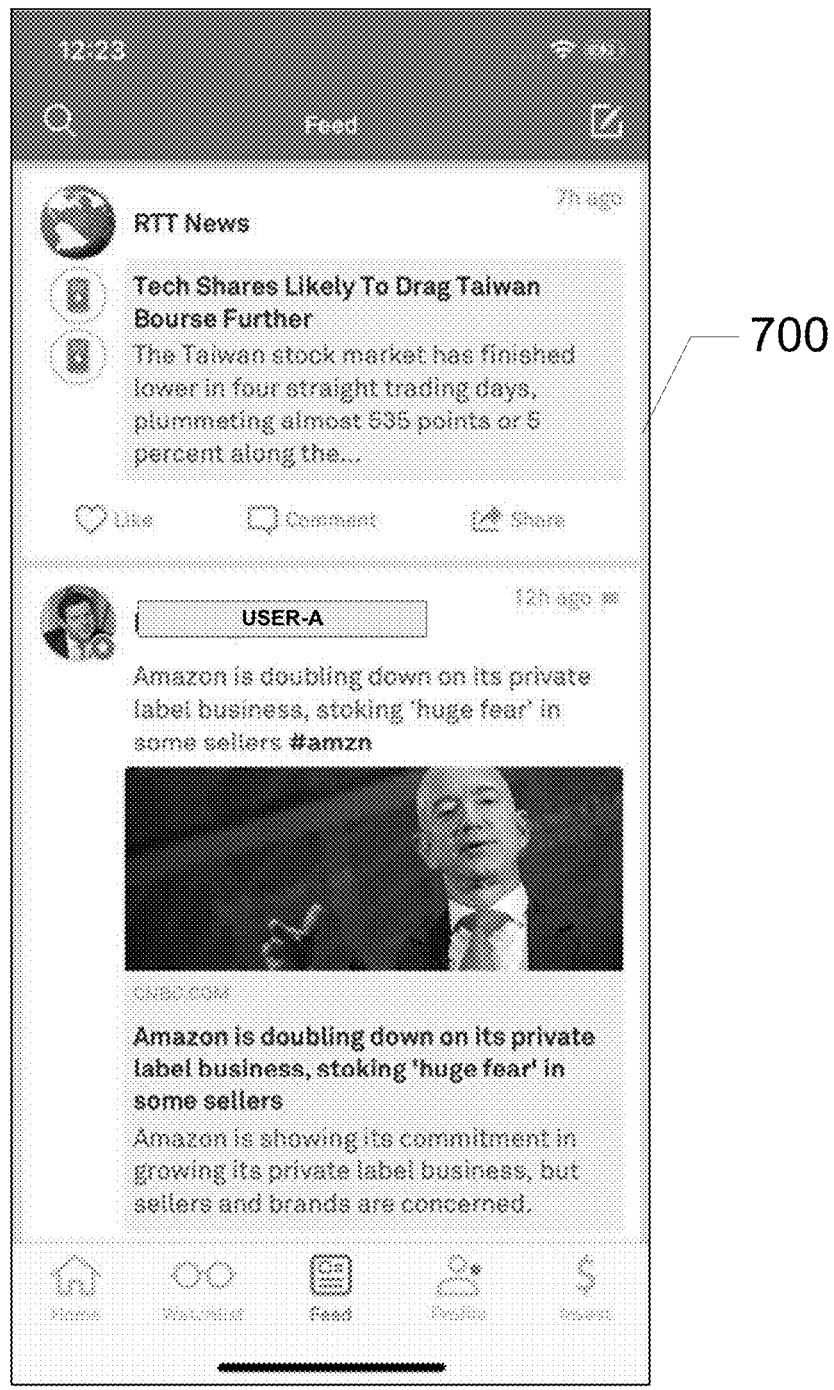
FIG. 7 is an example block diagram of an illustrative user media feed environment in accordance with one or more implementations.

With reference to FIGS. 3, 6 and 7, media consumption module 310 implements attribute data about a user's media consumption. The attribute data 320 relates to a unique user ID 322. The media consumption analysis may include media attribute records 324 storage indicative of the user's reading of news articles, viewing financial instrument prices, historical charts, technical charts, financial calendars, research reports and like. Media consumption module 310 may be software system implementing an API containing functions/sub-routines.

Figure 8:
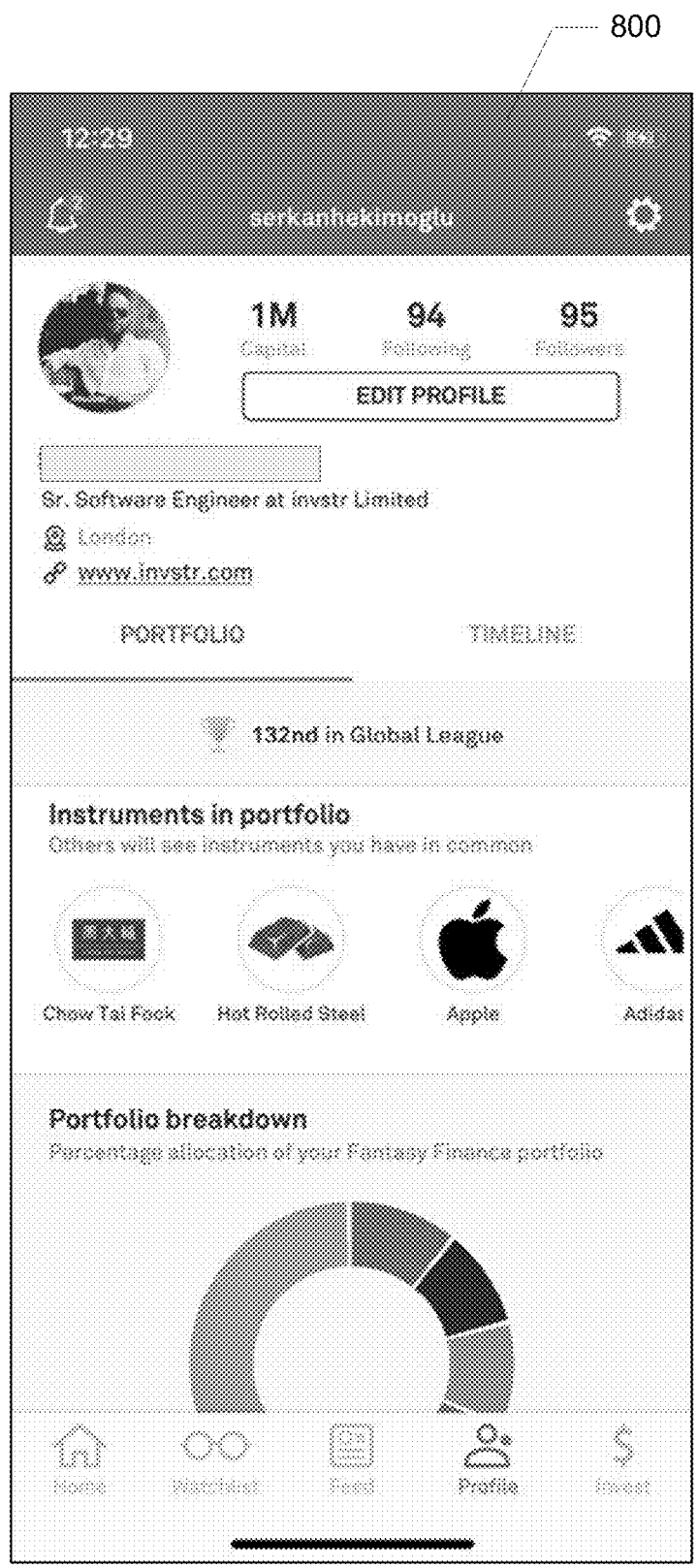
FIG. 8 is an example block diagram of an illustrative social interactions environment set in accordance with one or more implementations.
Figure 9:
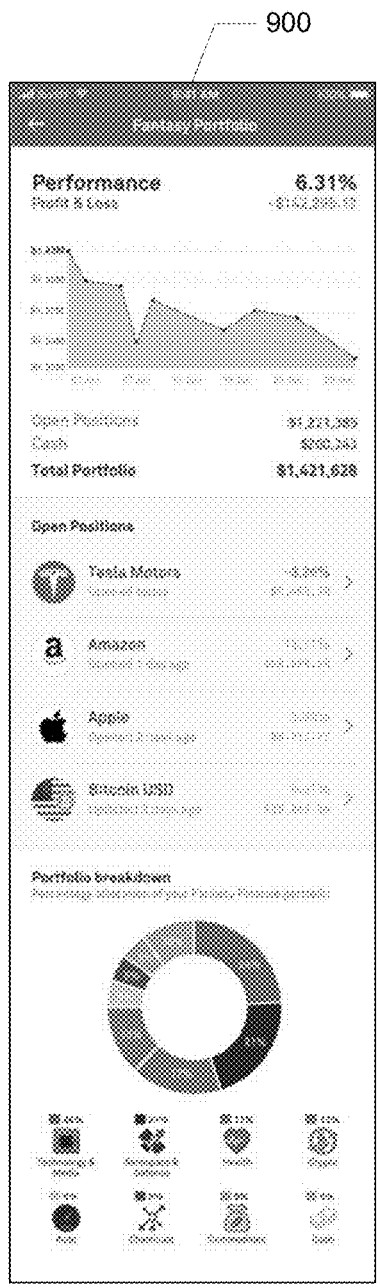
FIG. 9 is an example block diagram of an illustrative game portfolio environment in accordance with one or more implementations.
Figure 10:
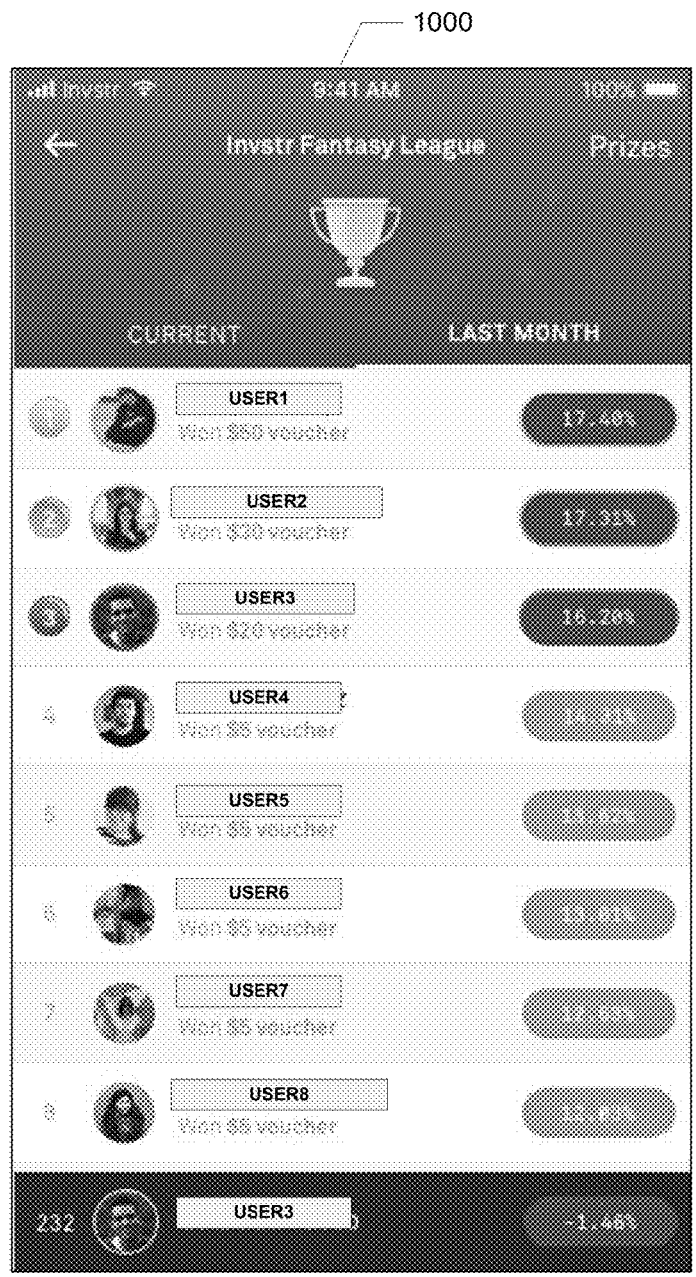
FIG. 10 is an example block diagram of an illustrative system league environment in accordance with one or more implementations.
Figure 11:
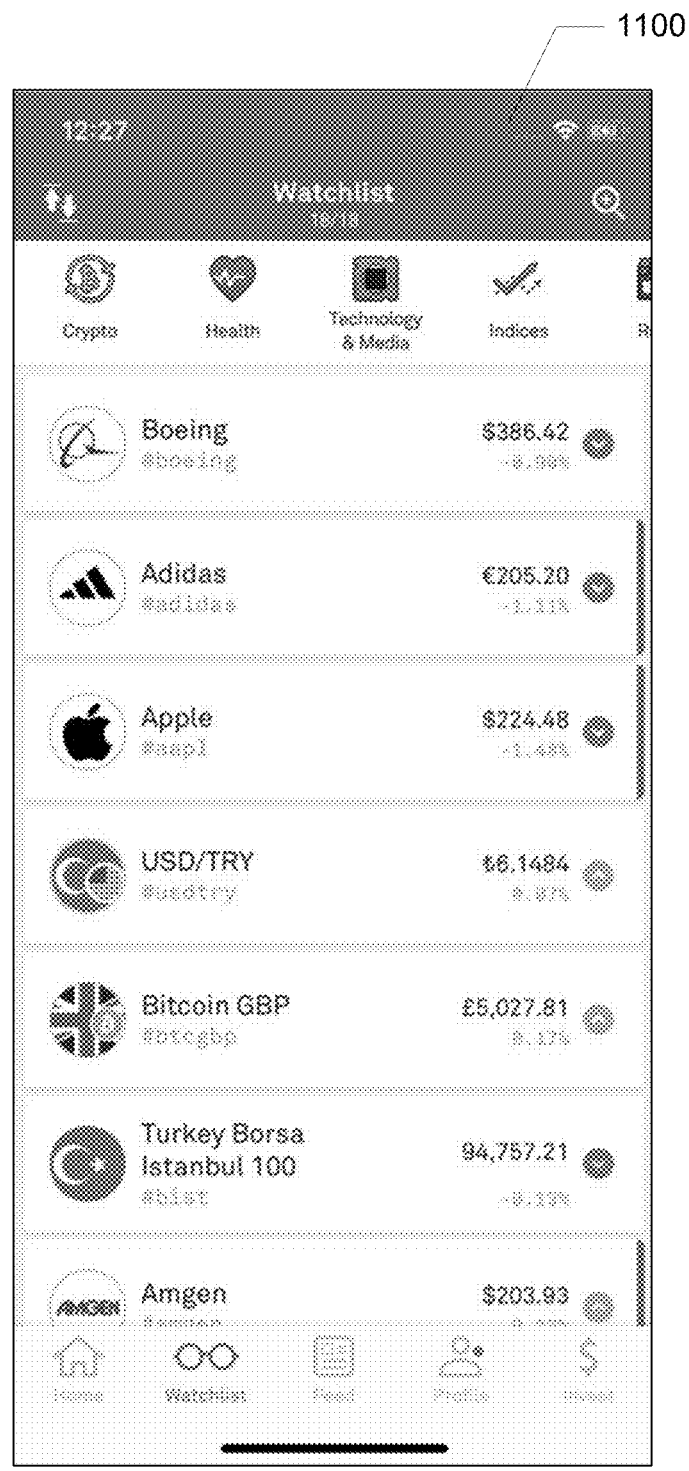
FIG. 11 is an example block diagram of an illustrative watchlist environment in accordance with one or more implementations.

With reference to FIGS. 3, 6 and 8, social media interaction module 312 implements social attribute data 326 about a user's social media interactions 800 within the system 300 and external networks. The social media interaction analysis may include social attribute records storage of who a user is following; who is following that user; the posts, likes, comments, internal and external shares that a user makes; which private leagues a user is in and who the other members of those private leagues are in the system. Social media interaction module 312 may be software system implementing an API containing functions/sub-routines.

With reference to FIGS. 3, 6, 9, 10 and 11, gamification module 314 implements game attribute data 328 about a user's game playing. The gamification analysis may include the instruments a user has in their watchlist environment 1100 and in their portfolio 900, and what instruments the user buys or sells. In the gamification module 314 enables a virtual portfolio management game with a watchlist environment 1100 with watchlist attribute data, securities and individuals compete in the global digital virtual fantasy league environment 1000 with user league attribute data. In this way users of system 300 can learn organically that investing is about generating a consistent return on capital over time as well as employing diversification concepts without excessive trading. In some implementations, the system 300 enables users to create and manage their own private leagues and invite their friends, colleagues and classmates to compete against them. In some implementations, a group chat functions enables the members of a Private League to communicate among themselves. They can further collaborate in these private leagues with the user of group chat messaging. In this way, user can learn about investing in a risk free-way. In some implementations, module 314 includes digital trophies—awards by the technology platform in recognition of the user's progress or achievements across a variety of potential interactions. Gamification module 314 may be software system implementing an API containing functions/sub-routines.

With reference to FIGS. 3, and 6, matching module 316 implements attribute data 332 for matching each user's profile with auto-indexed content. The content may be indexed using machine learning techniques according to the present disclosure. The content with the strongest match is then provided to the user through a variety of publication techniques including notifications and the user's media feed 700. In some implementations, matching module 316 implements attribute data for matching users with other users. Users with similar interest profiles are 'introduced' to each other as suggested people to follow. This is performed in order to encourage engagement and peer-to-peer learning. In some implementations, matching module 316 implements attribute data for matching to include products, such as financial products. Some or all of the components of a user's profile, including their interests, financial performance, risk and behavioral characteristics can be used to match a user against financial products exhibiting similar characteristics. Matching module 316 may be software system implementing an API containing functions/sub-routines.

In one implementation of the present disclosure and with continued reference to FIG. 3, quantum recommendation engine/module 308, the system 300 represents users (their interests) with quantum mechanical wave functions. The wave functions are then propagated in time in accordance with time dependent potentials which are generated by the interactions of the users with the recommended content. At the time of recommendation, a profile vector is generated and the contents that are in close proximity to the user's profile vector is recommended. In one implementation, system 300 can represent the contents with wave functions. In that case, the calculation of the overlap integral can be sufficient for finding the best match for content recommendation(s). System 300 generates a profile vector of the user interactions with the assumption that they are in a quantum environment. In another implementation, quantum recommendation engine 308 provides a recommendation engine based on the assumption that user's data interactions are in a quantum environment. The application of quantum mechanics can be used to create profiles/recommendations.

In one operation, when a user engages with the media content within system 300, the associated quantum mechanical wave function is disturbed. This disturbance causes fluctuations in the observables (e.g., user's interests). These may be interpreted as mood swings between multiple personalities, which cause slight shifts in users' interests, even in the absence of interactions. One of the points in recommending media content (such as financial content) is that the content's relevance to consumer's interests is time-sensitive that is, what might be relevant at one time could easily become irrelevant when more recent media content becomes available. The available media content at any point in time also can take account of changing consumer/user interests from one small time period to another period of time.

Some implementations of module 308, may include a Data Acquisition Component (DAC). This component may be written in Node.JS and responsible for extracting the data from AWS DynamoDB or from any other relevant data warehouse and creating the users data to be used in any component of the module 308. This component is also responsible for decomposing the profile data coming from the Profiler Component (PC) of the engine into useful Person Vectors (PV) to be used not only in the Recommender Component (RC) of the engine, but also in any other module of the system 300.

Some implementations of module 308, may include a Profiler Component (PC). In this component multi-computational tasks take place. It is responsible for profiling the users within multi-metric environment. In one implementation, it is capable of serving as a standalone unit in a server-side ecosystem, allowing any server-side unit to acquire profile tensors directly. PC implements variety line predictive models as well as on quantum mechanics (QM). In one implementation, PC is written in Python, however computationally intensive parts are written in C/F95. Profile tensors generated by PC are then sent back to DAC to produce profile vectors (PVs) by slicing profile tensors.

Some implementations of system 300, may include a Content Generation Component (CGC): Its purpose is to analyze the contents flowing in and bind them with the relevant instrument symbols and/or sectors. This component also analyzes the corpus and extracts the sentiments.

Some implementations of system 300, may include a Recommender Component (RC): This component may be written in Python programming language and it is where the profile data is analyzed with the content data. RC is also responsible for delivering the recommended content to the user.

Turning to FIG. 12, Operation 1200 in module 308 implements profiling based on the assumption that users are in a quantum environment to create a USER_QPROFILE. Referring to FIG. 12, for each USER on the recommendation list of system 300, the system can load an existing USER_QPROFILE, otherwise USER_QPROFILE is based on an initial quantum data based on the user preferences. The process flow of operation 1200 is provided in FIG. 12, the USER_QPROFILE is updated based on propagated wave function and center of trapping potentials of a particular financial instrument in the USER portfolio for a predetermined time interval. Operation 1200 may be performed by one or more hardware processors configured by machine-readable instructions including a module that is the same as or similar to module 308, in accordance with one or more implementations.

Turning to FIG. 13, Operation 1300 in module 308 implements quantum mechanics functions. Referring to FIG. 13, the operation 1300 process the users' quantum data (wave functions $\psi_s$ and center of trapping potentials $q_c$s for each instrument). In the process flow, if exist USER QPROFILEs the CONTENT CONTAINER contains the normalized content vectors and Number of contents N to be recommended to the user. The resultant output includes N content IDs to be recommended to each user. Operation 1300 may be performed by one or more hardware processors configured by machine-readable instructions including a module that is the same as or similar to module 308, in accordance with one or more implementations.

The framework for the quantum mechanics implementation of the present disclosure is discussed below for module 308. The user's interest in a particular financial instrument may be represented by a non-relativistic quantum particle of mass m confined to move in a one-dimensional infinite potential well of length L with the boundaries given by $$V_{con}(\zeta) = \begin{cases} \infty & 0 < \zeta < L \\ 0 & \text{otherwise} \end{cases} \quad \text{Equation 1}$$

Here $\zeta$ is the generalized coordinate that denotes the user's interest in a financial instrument. The operator $\hat{\zeta}$, which measures the user's interest in a financial instrument (or other product), corresponds to the position operator $\hat{x}$ in quantum mechanics therefore the operator $\hat{\zeta}$ is a hermitian operator. Similarly, the operator $\Lambda$, which measures how fast a user's interest shifts, corresponds to the momentum operator in quantum mechanics which is also a hermitian operator and is given by $$-i\hbar \frac{\partial}{\partial \zeta}.$$

The probability of having the user's interest between $\zeta$ and $\zeta+d\zeta$ at a given instant $|\Psi(\zeta, t)|^2 d\zeta$, is where $\psi(\zeta, t)$ is the normalized wave function representing the user's interest. To distinguish the user's negative interest in a financial instrument from the positive interest, the well is subdivided into two equal sized regions. The positive region is denoted by $\zeta < \zeta_c$ and the negative region is denoted by $\zeta > \zeta_c$, where $\zeta_c$ is L/2.

The user's interest in a financial instrument at a given time t is defined by a number between −1 and 1, and is given by $$I_{user}(t) \equiv 1 - \zeta_c^{-1} < \hat{\zeta}(t)>, \quad \text{Equation 2}$$

where $<\hat{\zeta}(t)>$ is the expectation value of the user's interest at time t, and is calculated as $$<\hat{\zeta}(t)> = \int_0^L \Psi^*(\zeta,t)\hat{\zeta}\Psi(\zeta,t)d\zeta. \quad \text{Equation 3}$$

The percentage of the user's interest in a financial instrument can then easily be obtained from Eq.(3) and be written as $$I_{user}^p(t) = 100 \times \left(1 - \zeta_c^{-1} \int_0^L \Psi^*(\zeta, t)\hat{\zeta}\Psi(\zeta, t)d\zeta\right). \quad \text{Equation 4}$$

The time dependence of the user's interest is modeled by a drifting potential function of the form $$V_{drift}(\zeta, t) = U_0 \exp\left(-\frac{(\zeta - d(t))^8}{a}\right), \quad \text{Equation 5}$$

where $U_0$ and a are the parameters associated with the depth and the width of the drift potential, respectively. The time dependent function d(t) in Eq.(5) plays an important role in driving the user's interest by the given feedback. The drift potential also serves as a mean to localize the user's interest to a smaller region of space provided that $U_0$ is chosen in a way the system supports at least one bound state. The initial wave function is prepared either purely in one of these bound states or in a linear combination of these states by first setting d(0) to some coordinate $\zeta_0$ which corresponds to the desired initial interest of the user in a financial instrument given by Eq.(2) for t=0. i.e. in the case of ground state, which is symmetric about $\zeta_0$ as long as $\zeta_0$ is sufficiently away from the boundaries with the proper choice of the parameter a, one sets $\zeta_0 = \zeta_c$ for zero initial interest or $\zeta_0 = \zeta_c(1-x/100)$ for the desired x percent initial interest of the user in a financial instrument.

The eigenstates $\Psi_n(\zeta)$ and eigenenergies $E_n$ of the user's interest at t=0 are obtained by solving the time-independent Schrodinger's equation, $$\hat{H}\psi_n(\zeta) = E_n\psi_n(\zeta). \quad \text{Equation 6}$$

The Hamiltonian H in Eq.(6) is given by:

$$\hat{H} = -\frac{\hbar^2}{2m}\frac{d^2}{d\zeta^2} + \hat{V}_{con}(\zeta) + \hat{V}_{drift}(\zeta, 0), \quad \text{Equation 7}$$

where $\hat{V}con(\zeta)=Vcon(\zeta)$, $\hat{V}drift(\zeta,0)=Vdrift(\zeta,0)$, h is the reduced Planck constant, and m is the "mass" of the user's interest. Eq.(6) can be solved numerically by discretizing the Hamiltonian in Eq.(7) on a uniformly spaced spatial grid consisting of N points. If the grid spacing is $\delta\zeta$, where $\delta\zeta \ll 1$, then the coordinate $\zeta_j$ is equal to $j\delta\zeta$ where $j=0, \ldots, N-1$ with $\zeta_0=0$ and $\zeta_{N-1}=L$. The discretized Hamiltonian applied to $\psi(\zeta)$ can then be written using the second-order central derivative formula as $$\hat{H}_j \psi_j = -\frac{\hbar^2}{2m}\left[\frac{\psi_{j+1} - 2\psi_j + \psi_{j-1}}{\delta\zeta^2}\right] + V_{con}^j \psi_j + V_{drift}^j \psi_j \quad \text{Equation 8}$$

where the index j represents the value of the function at the spatial coordinate $\zeta_j$. Eq.(8) can be rewritten in a triadiagonal symmetric matrix form in accordance with the following boundary conditions:

$$\psi(0) = \psi 0 = 0, \text{ and } \psi(L) = \psi N - 1 = 0. \quad \text{Equation 9}$$

as $$\hat{H}\psi = \begin{bmatrix} \alpha_1 & \beta & & & \\ \beta & \alpha_2 & \beta & & \\ & \beta & \ddots & \ddots & \\ & & \ddots & \ddots & \beta \\ & & & \beta & \alpha_{N-2} \end{bmatrix} \begin{bmatrix} \psi_1 \\ \psi_2 \\ \psi_3 \\ \vdots \\ \psi_{N-2} \end{bmatrix}, \quad \text{Equation 10}$$

where $$\alpha_j = \frac{\hbar^2}{m\delta\zeta^2} + V_{con}^j + V_{drift}^j \quad \text{Equation 21}$$

and $$\beta = \frac{\hbar^2}{2m\delta\zeta^2}. \quad \text{Equation 12}$$

The eigenvalues (eigenenergies) of the coefficient matrix in Eq.(10) can easily be found by invoking linear algebra packages such as commercially available LAPACK (http://www.netlib.org/lapack). In order to find the eigenvectors (eigenstates) of the Hamiltonian given in Eq.(10), one may deploy either shooting or relaxation method [2] in virtue of the boundary conditions given in Eq.(9). The initial wave function of the user's interest in a financial instrument can be written as a superposition of all these eigenstates since they form a complete set in Hilbert space:

$$\Psi(\zeta, 0) = \sum_n a_n \psi_n(\zeta), \quad \text{Equation 13}$$

where $\psi_n(\zeta)$ is the nth eigenstate corresponding to the nth eigenenergy and $|a_n|^2$ is the probability of finding the system in the nth eigenstate and can be calculated from $$a_n = \int_0^L \psi_n(\zeta) \Psi(\zeta, 0) d\zeta. \quad \text{Equation 14}$$

Once the initial wave function of the user's interest in a financial instrument is obtained, it is propagated from the moment of the last recommendation session at $t_{i-1}$ to the next at $t_i$. If feedback is given at $t=t'$ within the time interval $\Delta t$ of this two consecutive recommendation sessions, then the center d(t) of the time dependent potential $V_{drift}$ is moved along the direction of the given feedback by $$d(t) \leftarrow d(t) - \delta f_+, \quad \text{Equation 15}$$

if the feedback is positive, and $$d(t) \leftarrow d(t) + \delta f_-, \quad \text{Equation 16}$$

if the feedback is negative. The parameters $\delta f_+$ and $\delta f_-$ are much smaller than the size of the infinite potential well L. The time propagation of the wave function can be carried out by applying the time-evolution operator $$\hat{U}(t_i, t_{i-1}) = \exp\left[-\left(\frac{i}{\hbar}\right)\int_{t_{s-1}}^{t_i} \hat{H}(\zeta, t') dt'\right] \quad \text{Equation 17}$$

to the wave function $\psi(\zeta, t_{i-1})$ with $$\hat{H}(\zeta, t) = -\frac{\hbar}{2m}\frac{\partial^2}{\partial \zeta^2} + \hat{V}(\zeta, t), \quad \text{Equation 18}$$

where $$\hat{V}(\zeta, t) = \hat{V}_{con}(\zeta) + \hat{V}_{drift}(\zeta, t). \quad \text{Equation 19}$$

If the time interval $\Delta t$ is subdivided into finite number of time steps with $\delta t$ intervals, then the time-evolution operator in Eq.(17) can be written as $$\hat{U}(t_i, t_i-\delta t)\hat{U}(t_i-\delta t, t_i-2\delta t) \ldots \hat{U}(t_{i-1}+\delta t, t_{i-1}) \quad \text{Equation 20}$$

where the operator $\hat{U}$, for a sufficiently small time step $\delta t$, can be approximated as $$\hat{U}(t + \delta t, t) = \exp\left(\frac{i}{\hbar}\delta t \hat{H}(t)\right). \quad \text{Equation 31}$$

In order to propagate the wave function numerically, the time-evolution operator in Eq.(21) is further approximated by Pade' approximation. The Pade' approximant gives $$\hat{U} = \frac{1 - \frac{1}{2}\frac{i\delta t}{\hbar}\hat{H}}{1 + \frac{1}{2}\frac{i\delta t}{\hbar}\hat{H}}. \quad \text{Equation 22}$$

Applying Eq.(22) to the wave function $\psi(\zeta, t)$ gives $$\Psi(\zeta, t + \delta t) = \hat{U}\Psi(\zeta, t) \quad \text{Equation 23}$$

then $$\Psi(\zeta, t + \delta t) - \frac{i\hbar\delta t}{4m\delta\zeta^2}\Psi(\zeta, t + \delta t) + \frac{i\delta t}{2\hbar}\hat{V}(\zeta, t)\Psi(\zeta, t + \delta t) = \\ \Psi(\zeta, t) + \frac{i\hbar\delta t}{2\hbar}\Psi(\zeta, t) - \frac{i\delta t}{2\hbar}\hat{V}(\zeta, t)\Psi(\zeta, t) \quad \text{Equation 24}$$

Discretizing Eq.(24) using central derivative formula for the 2nd order derivatives gives $$\Gamma\Psi_{j+1}^{k+1} + \chi_j^k \Psi_j^{k+1} + \Gamma\Psi_{j-1}^{k+1} = \Omega_j^k, \quad \text{Equation 25}$$

where $$\Gamma = -\frac{i\hbar\delta t}{4m\delta\zeta^2}, \quad \text{Equation 26}$$

$$\chi_j^k = \left(1 - 2\Gamma + \frac{i\delta t}{2\hbar}V_j^k\right), \quad \text{Equation 27}$$

-continued $$\Omega_j^k = -\Gamma\Psi_{j+1}^k + \left(1 + 2\Gamma - \frac{i\delta t}{2}V_j^k\right)\Psi_j^k - \Gamma\Psi_{j-1}^k.$$ Equation 28

The indices k and j in above equations represent the value of the function at time t=kδt and coordinate ζ=jδζ, respectively. Eq.(25) gives a system of linear equations where $\psi^{k+1}$ represents $\psi(\zeta, t+\delta t)$ and are the unknowns of the system. However, Eq.(25) can be solved by rewriting it as a tridiagonal symmetric matrix form as $$\begin{bmatrix} \chi_1^k & \Gamma & & & \\ \Gamma & \chi_2^k & \Gamma & & \\ & \Gamma & \ddots & \ddots & \\ & & \ddots & \ddots & \Gamma \\ & & & \Gamma & \chi_{N-2}^k \end{bmatrix} \begin{bmatrix} \Psi_1^{k+1} \\ \Psi_2^{k+1} \\ \chi_3^{k+1} \\ \vdots \\ \Psi_{N-2}^{k+1} \end{bmatrix} = \begin{bmatrix} \Omega_1^k \\ \Omega_2^k \\ \Omega_3^k \\ \vdots \\ \Omega_{N-2}^k \end{bmatrix}.$$ Equation 29

The system of linear equations given in Eq.(29) is written in virtue of the boundary conditions given in Eq.(9) and it needs to be solved at every time step starting from the last recommendation time at $t_{i-1}$ to the next at $t_i$.

At the beginning of the next recommendation session, a profile vector is generated for the user from the wave functions representing the financial instruments (or other products) using Eq.(2) and then a similarity match is carried out between the profile vector and all the financial content vectors or other content vectors. The most similar content vector to the profile vector is recommended to the user by using matching module 316.

Profile Simulation Example

Figure 14:
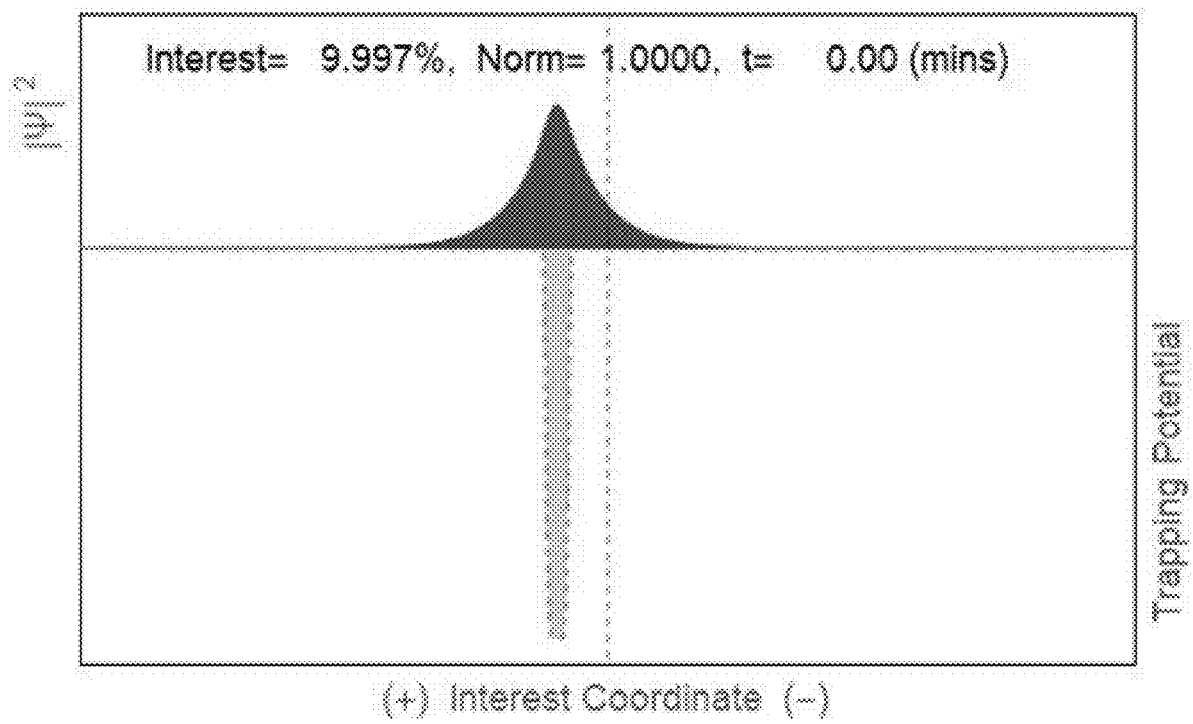
FIG. 14 is an example chart of an illustrative profile simulation with quantum mechanics in accordance with one or more implementations.
Figure 15:
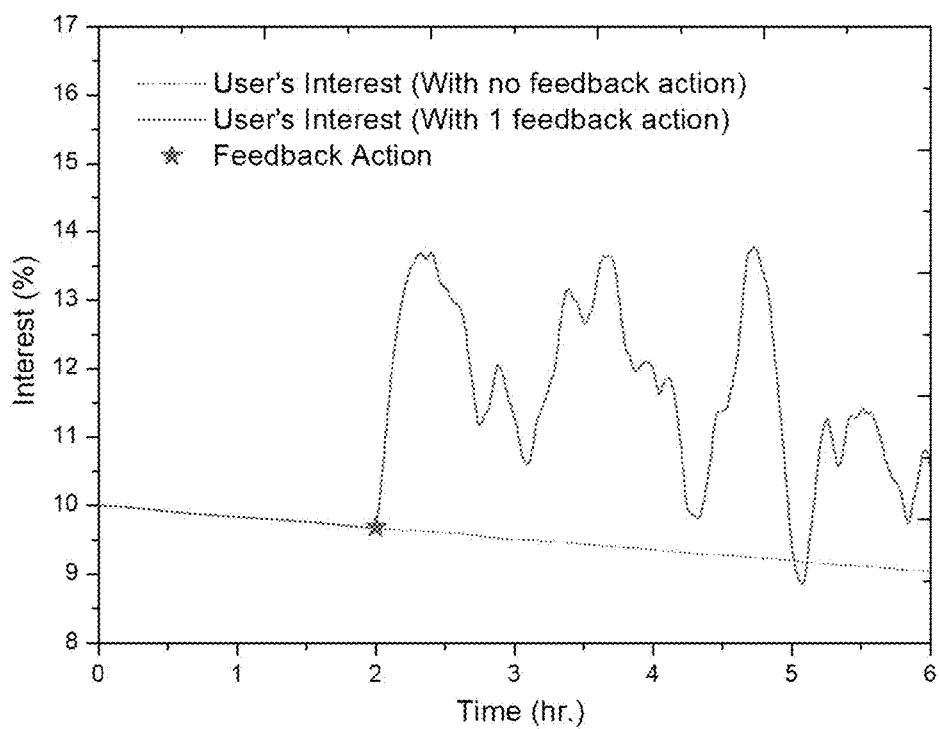
FIG. 15 is an example chart of an illustrative profile simulation with quantum mechanics in accordance with one or more implementations.

Referring to FIGS. 14 and 15, initial interest is based on the order of financial instruments in a user's watchlist 1100 on the system 300. The spatial distribution of the trapping potential localizes the "interest" in a certain region in interest space. As time progresses, a user's interest in a financial instrument slowly decays. The moment a feedback is given, the wave function representing the user's interest to a particular financial instrument is disturbed, which causes fluctuations in the user's interest in that instrument.

In this example, a profile vector is generated by applying the algorithm of module 308 to be compared with the content vectors.

In this example the following constants are used:
$a_0$=5.29177
$\hbar$ =1.054571
L=30$a_0$
$m_0$=1.129
δu=−0.3
δq=1
δλ=0.0955

The number of spatial grid points and temporal grid points are taken as 1000 and 1440, respectively.

Assume that the dimension of the instrument space (common stock) is 5 with the following instruments and their respective index numbers FORD (0), TESLA (1), INTEL (2), NVIDIA (3), APPLE (4).

Assume that the user has TESLA and INTEL in his/her watch list in system 300 and user data record. In this example, the wave function representing user's interest to each instrument is chosen as the ground state of the system. The initial interest is chosen as 10% ($q_c$=ζ$_0$=71.4389 in as discussed in operation 1200 and operation 1300 the foregoing) for the instruments which are already in the watch list of the user, and zero ($q_c$=ζ$_0$=L/2=79.3766) in as discussed in operation 1200 and operation 1300 the foregoing) for the other instruments.

TABLE 1

| | FB$_1$ | FB$_2$ | FB$_3$ | FB$_4$ | Interest(%) |
|---|---|---|---|---|---|
| FORD | — | — | — | — | 0.0 |
| TESLA (on watch list) | 0.6 hr | 3.6 hr | — | — | 9.869 |
| INTEL (on watch list) | 4.2 hr | — | — | — | 9.324 |
| NVIDIA | — | — | — | — | 0.0 |
| APPLE | — | — | — | — | 0.0 |

Table 1 shows a time table of feedback (FB) actions in between two consecutive recommendation sessions and their respective interest levels at the beginning of the 2nd recommendation session.

The list of feedback actions user provides between two consecutive recommendation sessions are given in Table 1. The profile vector consists of 5 components that corresponds to each instrument in the instrument space is defined as $\vec{p}=\Sigma_i a_i \hat{e}_i$, where the summation index i runs over {FORD, TESLA, INTEL, NVIDIA, APPLE} such that $\vec{p} \cdot \vec{p}=\Sigma_i |a_i|^2=1$ with the assumption that $\hat{e}_j$ are orthonormal vectors. In this case, the profile vector at the beginning of the 2nd recommendation session is $$\vec{p} = 0 \cdot \hat{e}_{FORD} + 0.717076 \hat{e}_{TESLA} + 0.696995 \hat{e}_{INTEL} + 0 \cdot \hat{e}_{NVIDIA} + 0 \cdot \hat{e}_{APPLE}$$

Figure 22:
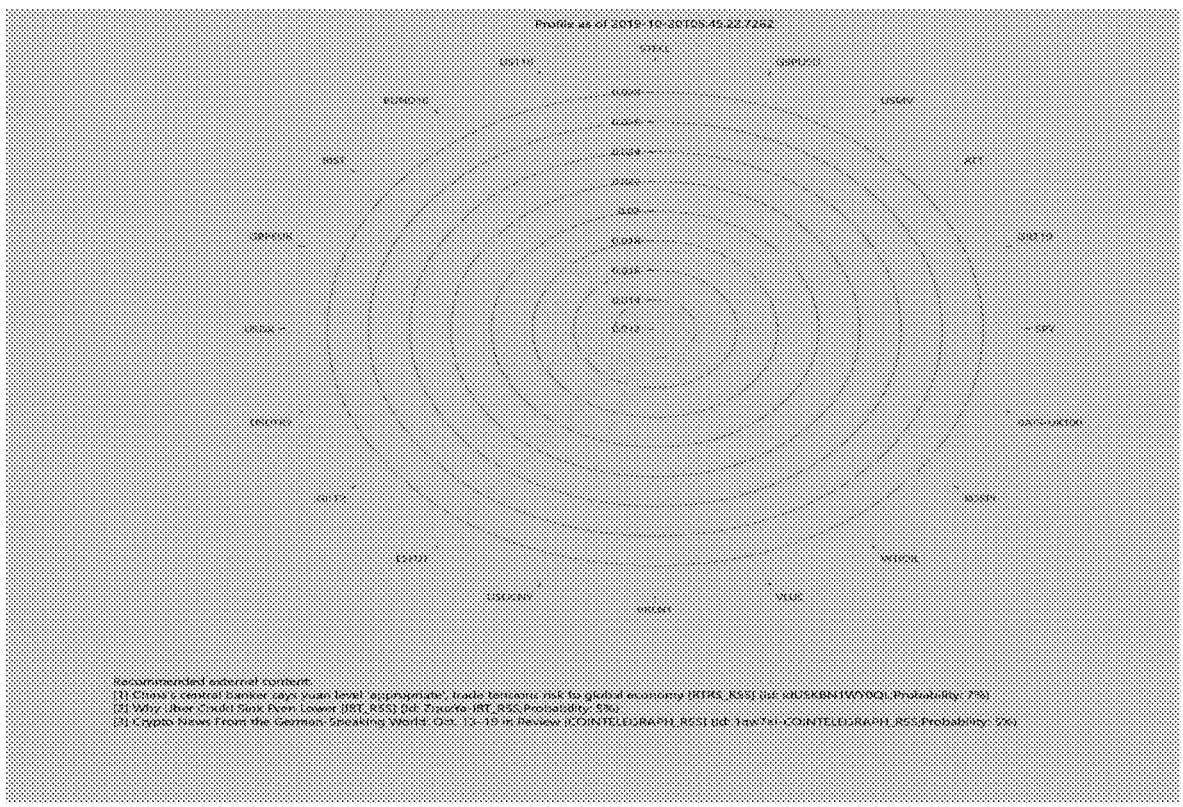
FIG. 22 is an example block diagram of an illustrative data visual of profile vector in accordance with one or more implementations.

The content vectors are also defined in a similar way. For each content vector $\vec{c}_i$, the similarity is checked by simply using the cosine theorem. The content with the closest content vector to the profile vector is recommended to the user. One example of a profile vector visualization is provided in FIG. 22.

Figure 5:
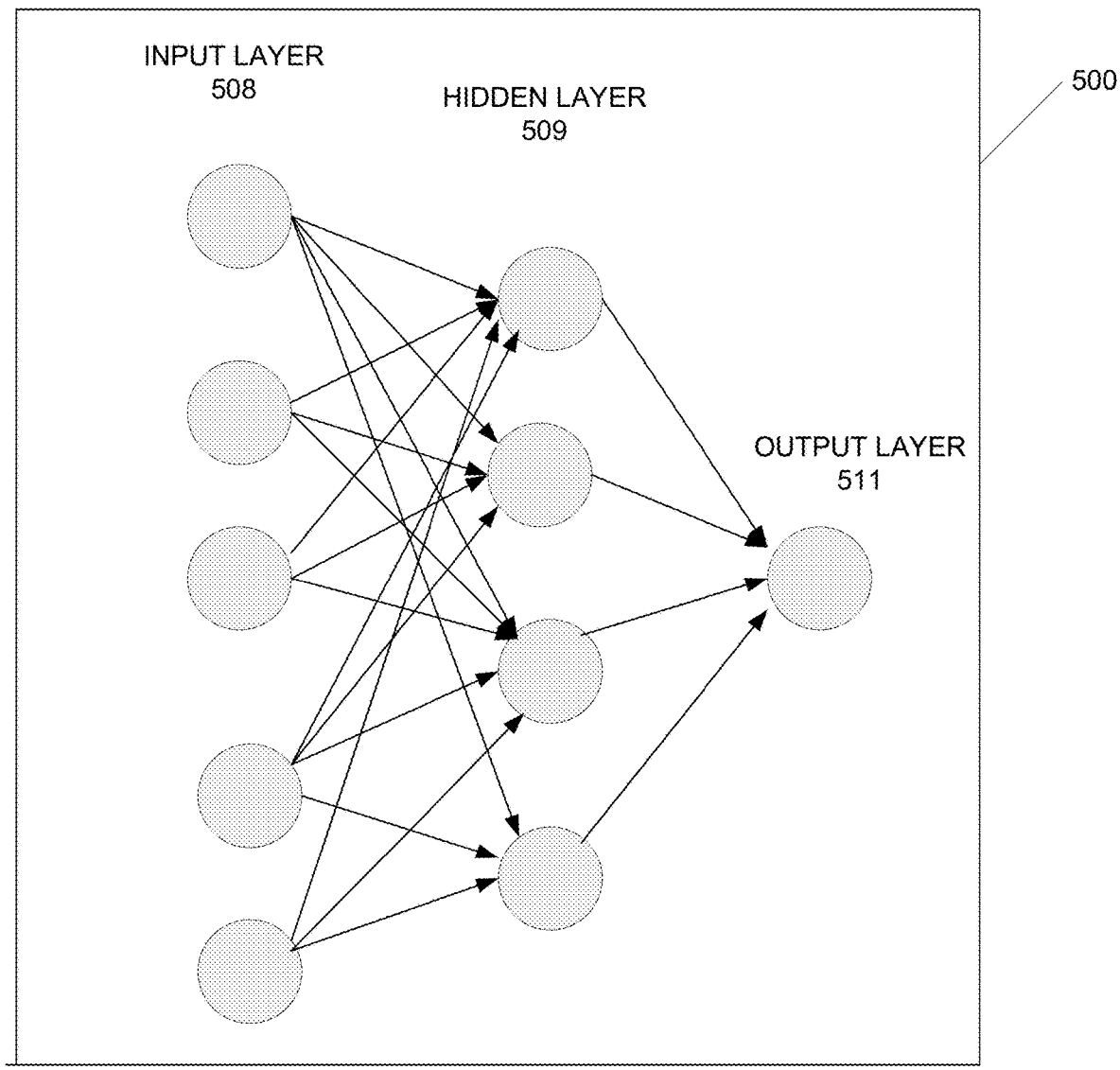
FIG. 5 is an illustrative functional block diagram of a neural network that may be used to implement the processes and functions, in accordance with one or more implementations.

Some aspects of various exemplary constructions are described by referring to and/or using neural network(s). Quantum recommendation engine/module 308 may be configured to electronically process with a machine deep learning controller. Various structural elements of neural network includes layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. Computer networks 203, 201 may incorporate various machine intelligence (MI) neutral network 500 (see FIG. 5) features of available Tensorflow (https://www.tensorflow.org) or Neuroph software development platforms (which are incorporated by reference herein). Referring to FIG. 5, neural network 500 is generally arranged in "layers" of node processing units serving as simulated neutrons, such that there is an input layer 508, representing the input fields into the network. To provide the automated machine learning processing, one or more hidden layers 509 with machine learning rule sets processes the input data. An output layer 511 provides the result of the processing of the network data.

In some other constructions, quantum recommendation engine/module 308 implements deep learning machine learning techniques implementing representation of learning methods that allows a machine to be given raw data and determine the representations needed for data classification. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Deep learning ascertains structure in data sets using backpropagation algorithms which are used to alter internal parameters (e.g., node weights) of the deep learning machine. Deep learning machines can utilize a variety of multilayer architectures and algorithms. While machine learning, for example, involves an identification of features to be used in training the network, deep learning processes raw data to identify features of interest without the external identification.

In some implementations machine learning controller processing module 308, deep learning in a neural network environment includes numerous interconnected nodes referred to as neurons. Input neurons, activated from an outside source, activate other neurons based on connections to those other neurons which are governed by the machine parameters. A neural network behaves in a certain manner based on its own parameters. Learning refines the machine parameters, and, by extension, the connections between neurons in the network, such that the neural network behaves in a desired manner.

One of implementations machine learning controller processing module 308 include deep learning technology that may utilize a convolutional neural network segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, rather than looking for an object, it is more efficient to look for edges which form motifs which form parts, which form the object being sought. These hierarchies of features can be found in many different forms of data such as speech and text, etc.

Learned observable features include objects and quantifiable regularities learned by the machine during supervised learning. A machine provided with a large set of well classified data is better equipped to distinguish and extract the features pertinent to successful classification of new data. A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given Example training dataset.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., module 308) has been trained to operate according to a specified threshold, etc.), the module 308 can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network can provide direct feedback to another process. In certain examples, the neural network outputs data that is buffered (e.g., via the cloud, etc.) and validated before it is provided to another process.

API Architecture

Figure 16:
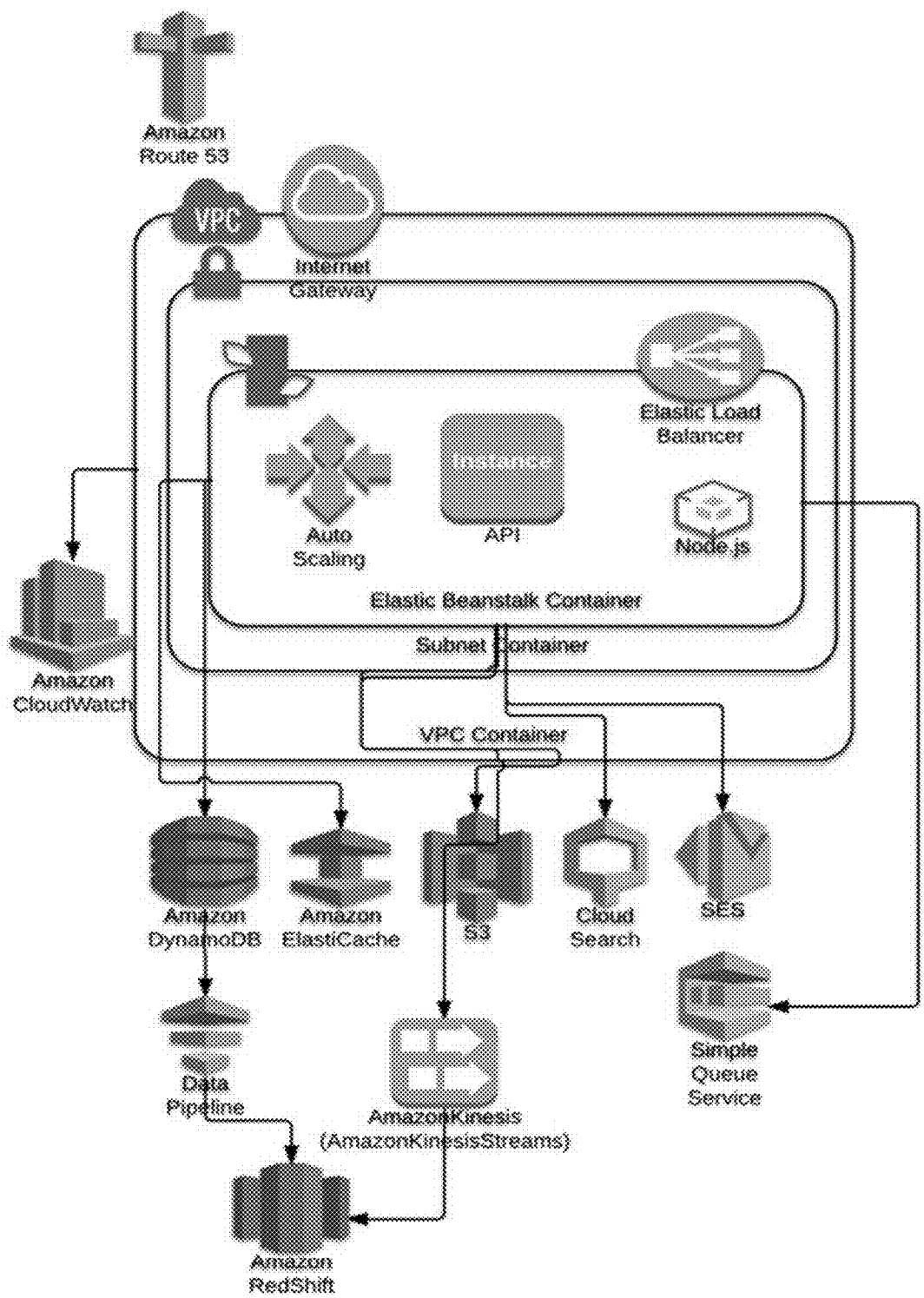
FIG. 16 is an example block diagram of an illustrative API Architecture in accordance with one or more implementations.

Referring to FIG. 16, in some implementations, the system 300 employs an AWS Elastic Beanstalk load balanced cluster with "auto scaling" capability housed in a Virtual Private Cloud (VPC) for robust security. The cluster automatically "adds" new servers when the existing servers' users go over a certain percentage of their capacity. Communication with the System 300 is SSL encrypted and authenticated with time-limited client tokens. Amazon infrastructure provides the network intrusion and network attack protection through the Route 53 DNS; use of VPC's and load balancers.

Data Streaming

Figure 17:
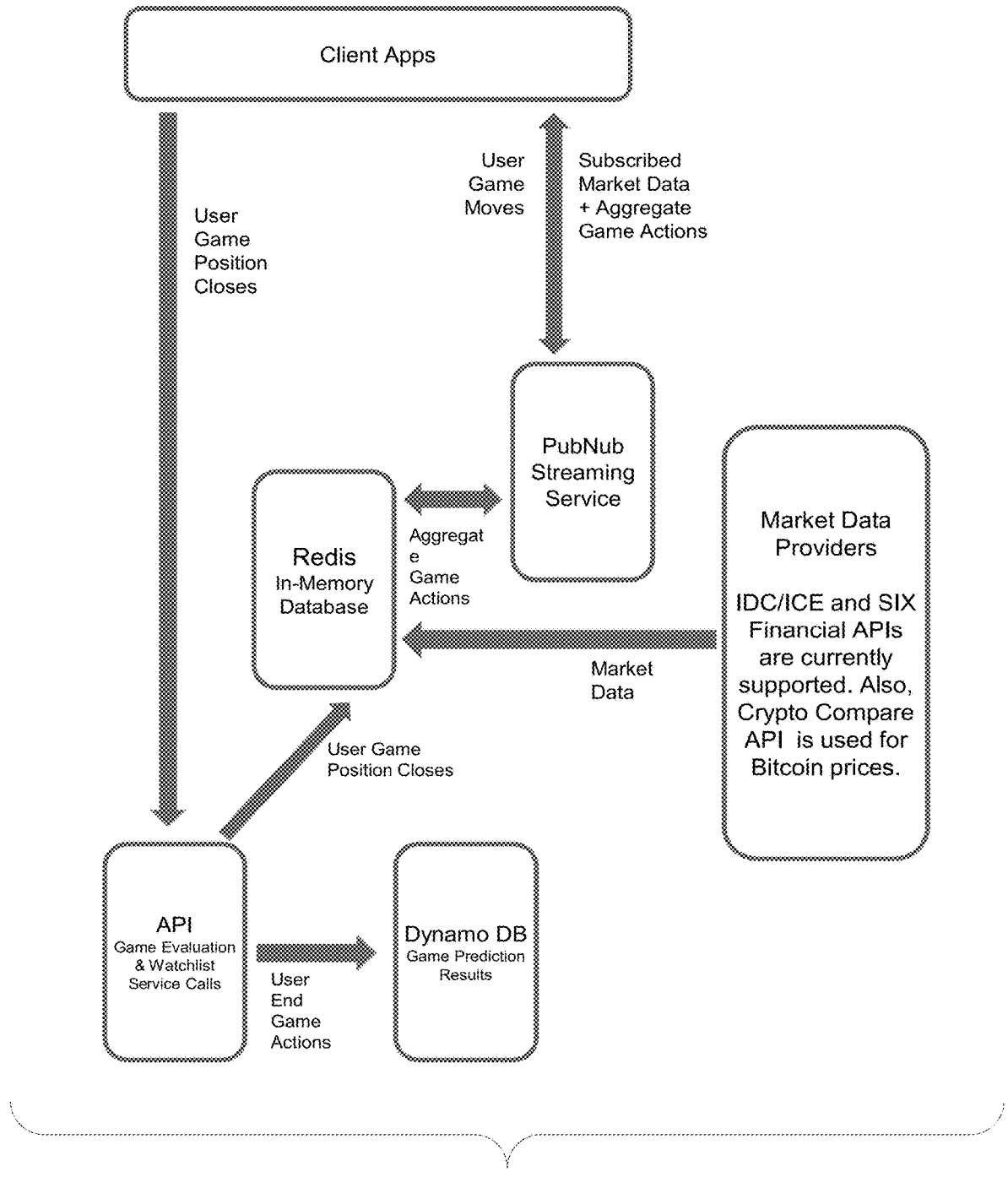
FIG. 17 is an example block diagram of a data streaming environment in accordance with one or more implementations.

Referring to FIG. 17, in some implementations, the system 300 and the associated Client Framework is capable of working with multiple streaming data providers such as PubNub, Lightstreamer or Kaazing depending on the implementation requirements (on the cloud or on-premise). PubNub is used to distribute real-time and delayed market data to native mobile clients in a "throttled" fashion to optimize data charges. In some implementations Custom index data feeds and portfolio game evaluations are part of real-time data stream.

Cache Structure

Figure 18:
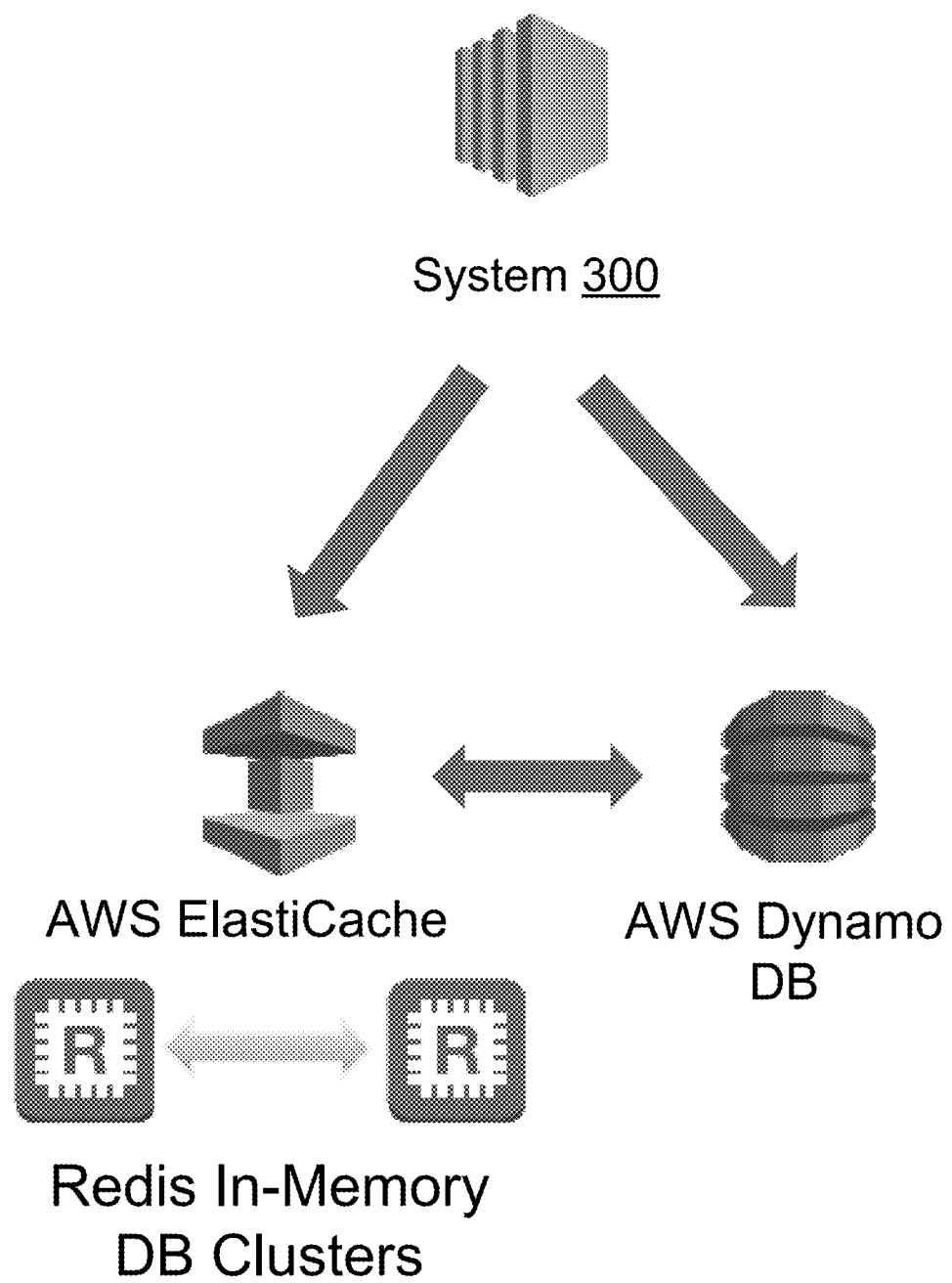
FIG. 18 is an example block diagram of an illustrative cache structure in accordance with one or more implementations.

Referring to FIG. 18, in some implementations, system 300 uses multiple Redis in-memory database clusters for increasing the performance of the system (this also allows eliminates a single point of failure). This implementation allows fast object store that scales up "well" for user access ("token") management. This implementation enables high write throughput for poll & feed items. This implementation enables real time game positions and latest prices of instruments. This implementation enables atomic manipulation of object members such as game price & positions values and real time feed structure. This implementation enables custom index calculations. In another implementation, the API, Content Daemons, PPAD engine 2000 (see FIG. 20) and market data distribution use separate AWS Redis instances to avoid a single point of failure as well as perform better load distribution. The system 300 also implements Distributed Job Queues. Whenever an API call pushes a task to a queue, this "task" will be popped by exactly one worker and executed. For example, the Live feed 700 of system 300 works with such job queues.

Data Warehouse

Figure 19:
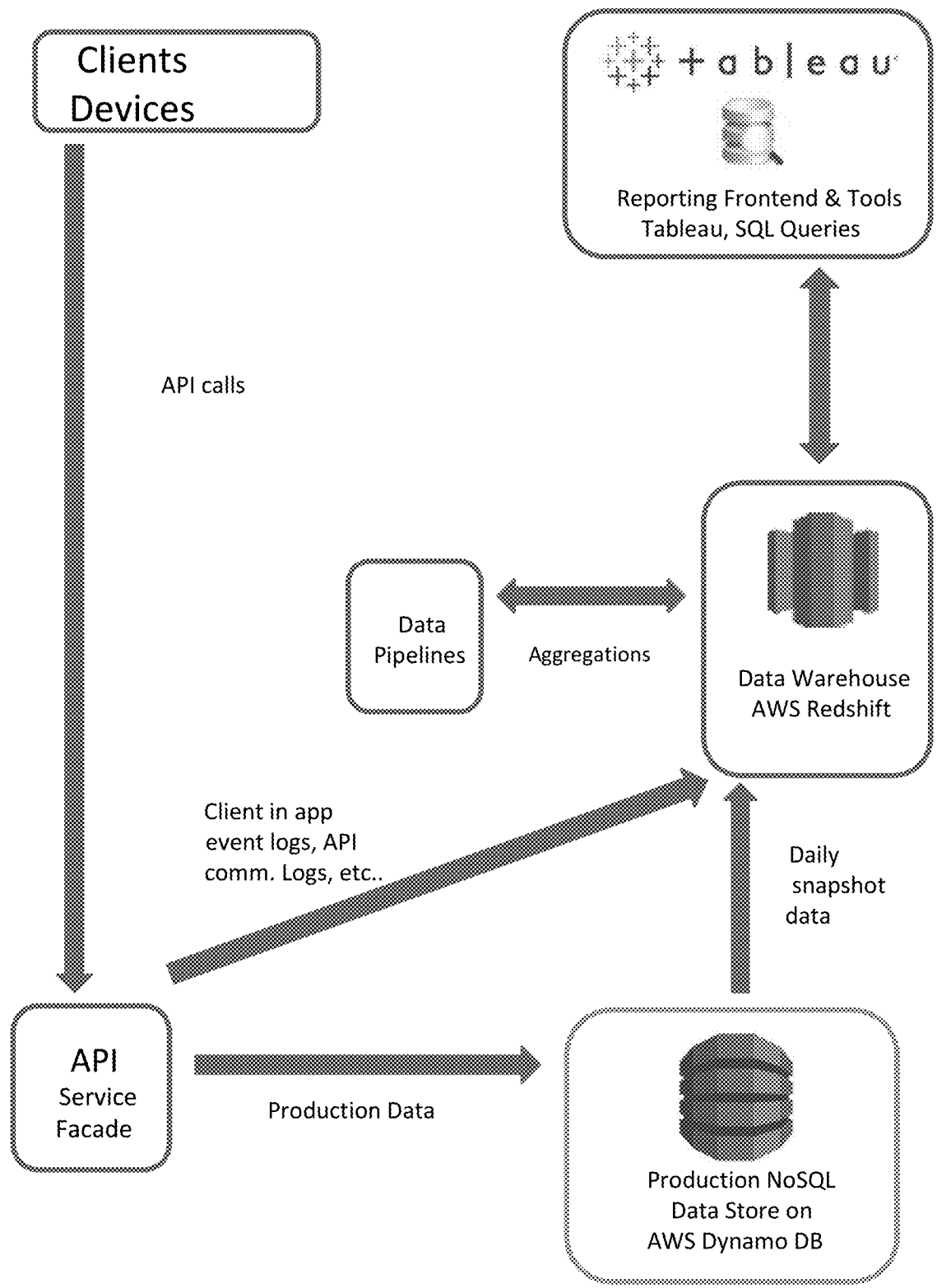
FIG. 19 is an example block diagram of an illustrative data warehouse environment in accordance with one or more implementations.

Referring to FIG. 19, in some implementations, system 300 is implemented on an AWS Redshift Cluster and is composed of three or more data groups (e.g. Daily Data Snapshots, User Events and Logs, reports). Daily Data Snapshots in which the production data tables snapshots are copied to the data warehouse daily by AWS Data Pipelines. Real-Time and nearly Real-Time user Events and Logs include all server HTTPS communication logs, Client in-app event logs and Chat and real time market data logs. Aggregations for daily, weekly and monthly reports in which aggregation is performed on AWS Data Pipelines for users, sessions, games, instruments, purchases, and other significant interactions.

Referring to FIG. 20, in some implementations, system 300 with gamification module 314 employs Price and Portfolio Position Profit Alert Engine 2000 that is tasked to send alerts (in the form of mobile device notifications) to users regarding significant changes in security prices and large shifts in Profit and Loss positions of predictions made by the users (in games with gamification module 314). In some implementations, the system 300 draws a chart and posts it to the media feed 700 (e.g., #invstream) as a tweet if an instrument's latest price exceeds 52 weeks' low/high.

In some implementations, computing platform(s) 302, remote platform(s) 304, and/or external resources 340 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 340 may be operatively linked via some other communication media.

A given remote platform 304 may include one or more processors configured to execute computer program modules. The computer program modules may be configured to enable an expert or user associated with the given remote platform 304 to interface with system 300 and/or external resources 340, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 340 may include sources of information outside of system 300, external entities participating with system 300, and/or other resources. In some implementations, some or all of the functionality attributed herein to external resources 340 may be provided by resources included in system 300.

Computing platform(s) 302 may include electronic storage 330, one or more processors 318, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 330 may comprise non-transitory storage media that electronically stores information. The electronic storage media of electronic storage 330 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 330 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 330 may include one or more virtual storage resources (e.g., cloud storage, a virtual private network, and/or other virtual storage resources). Electronic storage 330 may store software algorithms, information determined by processor(s) 318, information received from computing platform(s) 302, information received from remote platform(s) 304, and/or other information that enables computing platform(s) 302 to function as described herein.

Processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308, 310, 312, 314, 316 and/or other modules. Processor(s) 318 may be configured to execute modules 308, 310, 312, 314, and/or 316, and/or other modules by software; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, and 316 are illustrated in FIG. 3 as being implemented within a single processing unit, in implementations in which processor(s) 318 includes multiple processing units, one or more of modules 308, 310, 312, 314, and/or 316 may be implemented remotely from the other modules. The description of the functionality provided by the different modules 308, 310, 312, 314, and/or 316 described below is for illustrative purposes, and is not intended to be limiting, as any of modules 308, 310, 312, 314, and/or 316 may provide more or less functionality than is described. For example, one or more of modules 308, 310, 312, 314, and/or 316 may be eliminated, and some or all of its functionality may be provided by other ones of modules 308, 310, 312, 314, and/or 316. As another example, processor(s) 318 may be configured to execute one or more additional modules that may perform some or all of the functionality attributed below to one of modules 308, 310, 312, 314, and/or 316.

Figure 4:
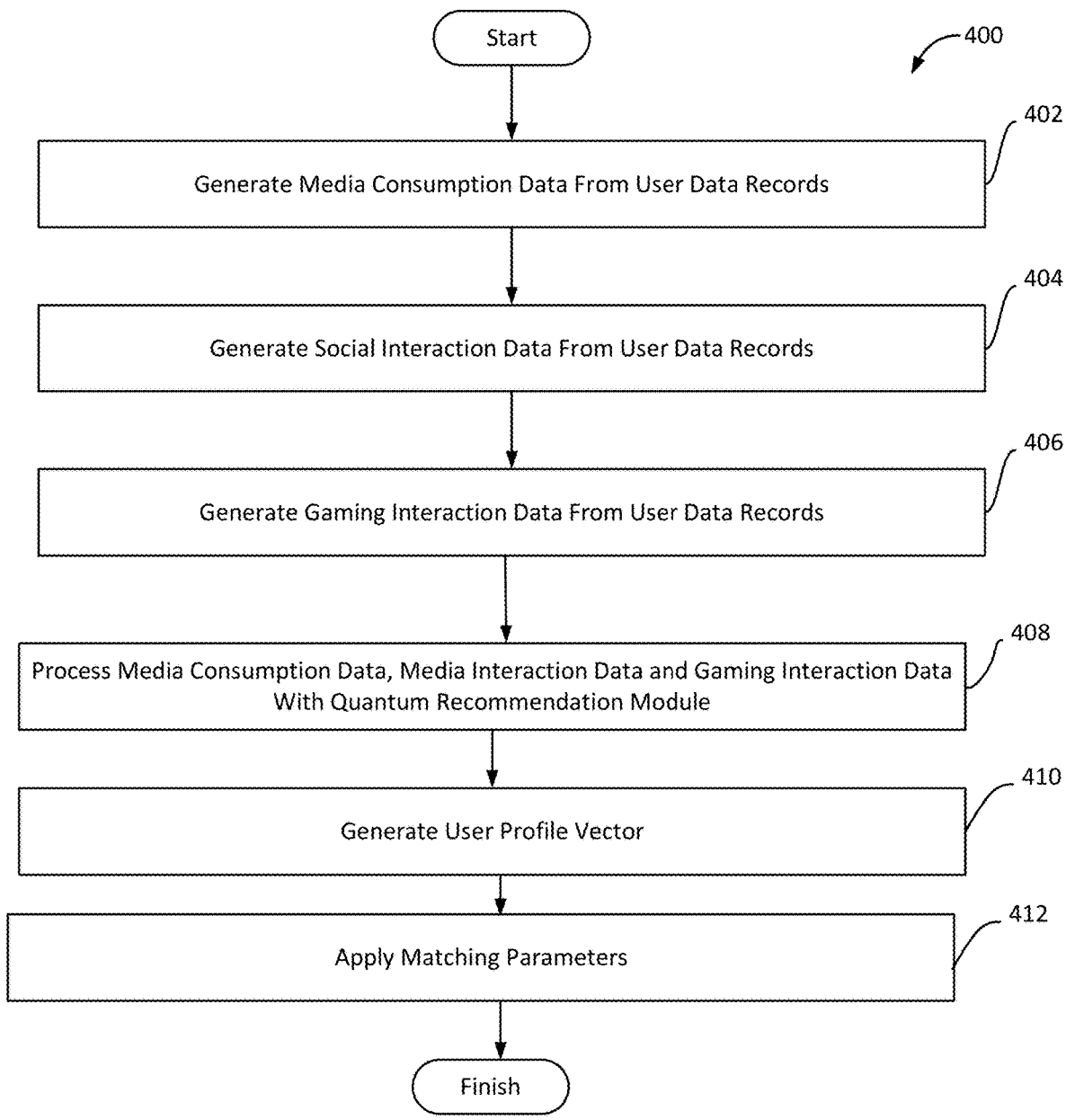
FIG. 4 illustrates a method for data processing, in accordance with one or more implementations.

FIG. 4 illustrates a method 400 for data processing, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4 illustrates method 400, in accordance with one or more implementations. An operation 402 may include generating media consumption data from a computer readable set of user data records. Operation 402 may be performed by one or more hardware processors configured by machine-readable instructions including a module that is the same as or similar to module 310, in accordance with one or more implementations.

An operation 404 may include electronically processing the computer readable set of user data records to generate social interaction data. Operation 404 may be performed by one or more hardware processors configured by machine-readable instructions including a module that is the same as or similar to module 312, in accordance with one or more implementations.

An operation 406 may include electronically processing the computer readable set of user data records to generate gaming interaction data. Operation 406 may be performed by one or more hardware processors configured by machine-readable instructions including a module that is the same as or similar to module 314, in accordance with one or more implementations.

An operation 408 may include electronically processing the media consumption data, the media interaction data and the gaming interaction data with a quantum recommendation module. Operation 408 may be performed by one or more hardware processors configured by machine-readable instructions including a module that is the same as or similar to module 308, in accordance with one or more implementations.

An operation 410 may include generating a computer readable user profile vector or quantum-based profile vector associated with at least one of the user data records or each of the user data records. Operation 410 may be performed by one or more hardware processors configured by machine-readable instructions including a module that is the same as or similar to module 308, in accordance with one or more implementations.

An operation 412 may include electronically processing the user profile vectors to generate matching parameters. Operation 412 may be performed by one or more hardware processors configured by machine-readable instructions including a module that is the same as or similar to module 316, in accordance with one or more implementations.

Figure 21:
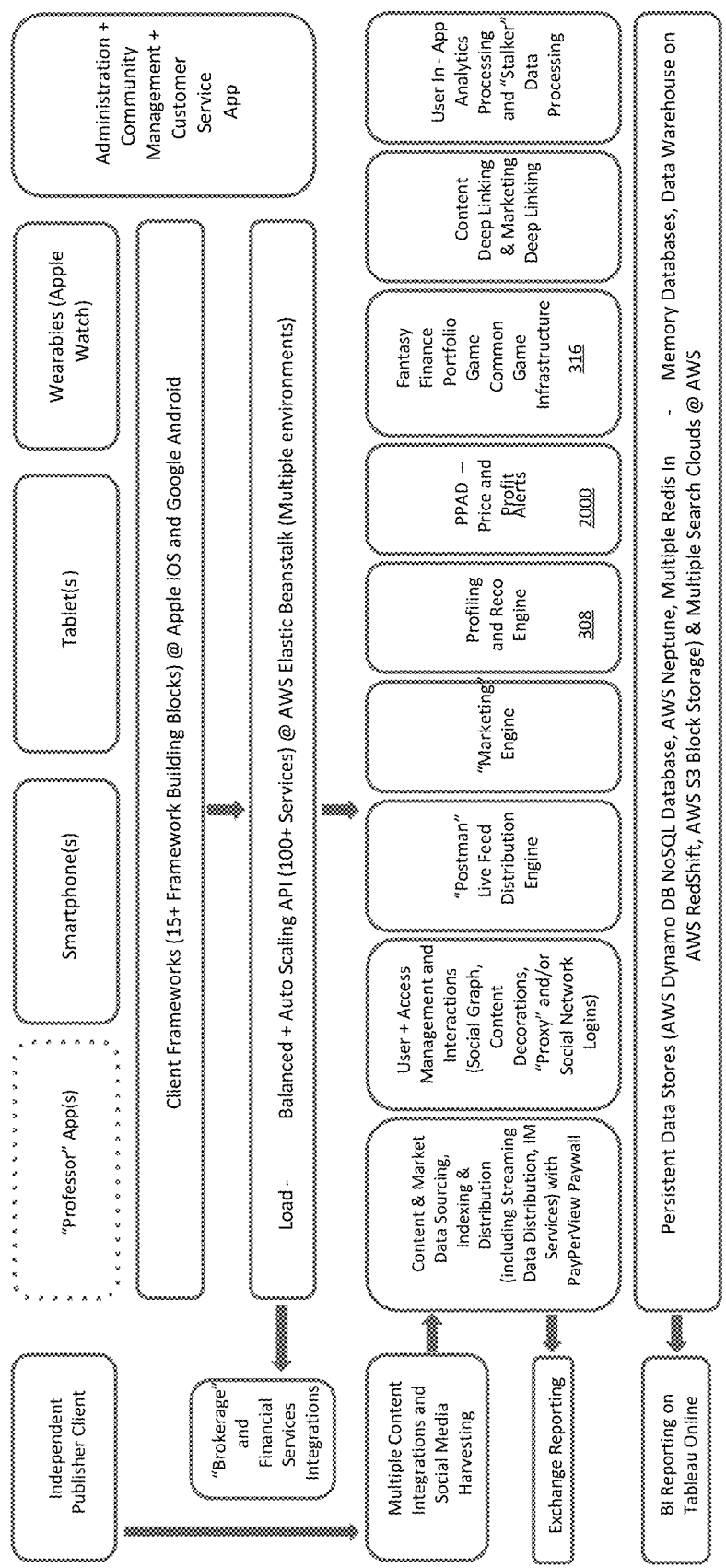
FIG. 21 is a schematic diagram of a digital computing environment in which certain aspects of the present disclosure may be implemented.

FIG. 21 illustrates a schematic diagram of a digital computing environment 300' in which certain aspects of the present disclosure may be implemented. In some implementations, there is provided a portfolio page displaying the client's investment portfolio and the historical performance of the portfolio. In some implementations, there is provided a watchlist displaying the financial instruments that the client is following. In some implementations, there is provided a section where the client can discover new instruments to follow or invest in. In some implementations, there is provided an Instrument Hub where the client can see fundamental data for each financial instrument; community sentiment; historical, comparison and technical charting; and a dedicated news feed including news articles, research reports and events calendar for each financial instrument. In some implementations, there is provided a 'Trade screen' where a client can execute transactions. In some implementations, there is provided a Leaderboard page where the client can find the top performers within the community. In some implementations, there is provided a track record function—an analysis of a client's portfolio describing her performance; implicit investment mandate; investment style based on financial factor analysis; behavioral analysis of a user's investment transaction history; a measure of a user's success in timing the entry and exit of their investment decisions. In some implementations, there is provided the ability for a user to open bank and brokerage accounts and spend their funds using a connected debit card or invest her money across a broad range of financial assets and crypto currencies. In some implementations, there is provided a Transaction History & Filter—the ability for a user to review her banking or investment transactions, filter them and drill down to the details of a specific transaction.

Aspects of the present disclosure provide a rich user experience by integrating one or more of personalized content, gamification of the financial markets, social features and ecommerce capabilities in a single user experience. System 300, 300' drive client engagement and to help clients build confidence, knowledge and wealth in a financial investing context. It overcomes problems that have been identified when it comes to popularizing investing. While the present technology has been described for the purpose of illustration based on what is currently considered to be the most practical and preferred implementations, aspects of the present disclosure could be applied to numerous other industry verticals wherever technology platforms or service providers seek to create maximum client engagement, personalization and convenience.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:
1. A computer implemented method of data processing, comprising:
electronically processing a computer readable set of user data records to generate media consumption data;

electronically processing the computer readable set of user data records to generate social interaction data;

electronically processing the computer readable set of user data records to generate gaming interaction data;

electronically processing the media consumption data, the media consumption data and the gaming interaction data with a quantum recommendation module including convolutional neural network segments data using convolutional filters without the external identification; and generating a computer readable user profile vector associated with at least one of the user data records.

2. The method of claim 1, further comprising electronically matching the least one of the user data records to media content.

3. The method of claim 1, wherein the quantum recommendation module includes quantum-based wave functions.

4. The method of claim 1, wherein the quantum recommendation module includes a quantum center trapping potential.

5. The method of claim 1, wherein the quantum recommendation module includes a machine learning module.

6. The method of claim 1, wherein the gaming interaction data includes user league attribute data.

7. The method of claim 1, wherein the gaming interaction data includes watchlist attribute data.

8. The method of claim 1, wherein the media consumption data includes a media feed.

9. The method of claim 1, further comprising electronically providing instructions for transmitting computer readable mobile alerts to a communications device.

10. A system configured for data processing, the system comprising:

one or more hardware processors configured by machine-readable instructions to:

electronically process a computer readable set of user data records to generate media consumption data;

electronically process the computer readable set of user data records to generate social interaction data;

electronically process the computer readable set of user data records to generate gaming interaction data;

electronically process the media consumption data, the media consumption data and the gaming interaction data with a quantum recommendation module including convolutional neural network segments data using convolutional filters without the external identification; and generate a computer readable user profile vector associated with at least one of the user data records.

11. The system of claim 10, wherein the one or more hardware processors are further configured by machine-readable instructions to electronically match the user profile vector for least one of the user data records to media content.

12. The system of claim 10, wherein the quantum recommendation module utilizes quantum-based wave functions.

13. The system of claim 10, wherein the quantum recommendation module utilizes quantum center trapping potential.

14. The system of claim 10, wherein the quantum recommendation module utilizes machine learning.

15. The system of claim 10, wherein the gaming interaction data includes user league attribute data.

16. The system of claim 10, wherein the gaming interaction data includes watchlist attribute data.

17. The system of claim 10, wherein the media consumption data includes a media feed.

18. A computing platform configured for data processing, the computing platform comprising:

a non-transient computer-readable storage medium having executable instructions embodied thereon; and one or more hardware processors configured to execute the instructions to: electronically processing a computer readable set of user data records to generate media consumption data;

electronically processing the computer readable set of user data records to generate social interaction data;

electronically processing the computer readable set of user data records to generate gaming interaction data;

electronically processing the media consumption data, the media consumption data and the gaming interaction data with a quantum recommendation module including convolutional neural network segments data using convolutional filters without the external identification; and generating a computer readable quantum profile vector associated with at least one of the user data records.

19. The computing platform of claim 18, wherein the one or more hardware processors are further configured by the instructions to electronically match the quantum profile vector for least one of the user data records to media content.

20. The computing platform of claim 18, wherein the quantum recommendation module utilizes quantum-based wave functions.

* * * * *